United States Patent [19]

Kawasaki et al.

[11] Patent Number: 6,076,061
[45] Date of Patent: *Jun. 13, 2000

[54] SPEECH RECOGNITION APPARATUS AND METHOD AND A COMPUTER USABLE MEDIUM FOR SELECTING AN APPLICATION IN ACCORDANCE WITH THE VIEWPOINT OF A USER

[75] Inventors: Katsuhiko Kawasaki; Yasunori Ohora, both of Yokohama; Yasuhiro Komori, Kawasaki, all of Japan

[73] Assignee: Canon Kabushiki Kaisha, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/524,949

[22] Filed: Sep. 8, 1995

[30] Foreign Application Priority Data

Sep. 14, 1994 [JP] Japan .................................. 6-220404

[51] Int. Cl.$^7$ ..................................................... G10L 7/08
[52] U.S. Cl. ......................... 704/270; 704/271; 704/275
[58] Field of Search ................................ 395/2.79, 2.84, 395/2.81

[56] References Cited

U.S. PATENT DOCUMENTS

| | | | |
|---|---|---|---|
| 3,986,030 | 10/1976 | Teltscher ................................ | 250/349 |
| 4,406,626 | 9/1983 | Anderson et al. ..................... | 434/169 |
| 4,595,990 | 6/1986 | Garwin et al. ......................... | 364/518 |
| 4,702,575 | 10/1987 | Breglia ................................... | 351/210 |
| 4,894,777 | 1/1990 | Negishi et al. ......................... | 364/419 |
| 5,220,629 | 6/1993 | Kosaka et al. .......................... | 381/52 |
| 5,377,303 | 12/1994 | Firman . | |
| 5,381,514 | 1/1995 | Aso et al. .............................. | 395/2.73 |

FOREIGN PATENT DOCUMENTS

| | | |
|---|---|---|
| 0 472 356 A1 | 2/1992 | European Pat. Off. . |
| 0 618 565 A2 | 10/1994 | European Pat. Off. . |
| WO 87/07497 | 12/1987 | Sweden ............ A61F 4/00 |
| WO 91/17522 | 11/1991 | WIPO ............................ G06K 11/18 |
| WO 93/14454 | 7/1993 | WIPO ............................. G06F 3/00 |
| WO 94/16435 | 7/1994 | WIPO . |

OTHER PUBLICATIONS

Alan Arper ("Researchers focus on promise of eye–gaze technology", Computer World, Executive Report, Mar. 11, 1986, pp. 3–6), Nov. 1986.

Ronald stephens ("A voice for the disabled", New Scientis, vol.114, Issue 1563, Jun. 4, 1987, pp. 58–61).

Michael Alexander ("In search of a better interface", Computerworld, Jul. 1990, p. 22).

Frey et al., ("Eye–Gaze Word Processing", IEEE Transactions on Systems, Man, and Cybernetics, vol.20, No.4, Jul. 1990, pp. 944–950).

Olshan ("Invisible input devices:experiments in thought–controlled computing", PC magazine, Nov. 1996, pp. 1–2).

*Primary Examiner*—David R. Hudspeth
*Assistant Examiner*—Vijay B. Chawan
*Attorney, Agent, or Firm*—Fitzpatrick, Cella, Harper & Scinto

[57] ABSTRACT

A viewpoint of a user is detected in a viewpoint detecting process, and how long the detected viewpoint has stayed in an area is determined. The obtained viewpoint and its trace is displayed on a display unit. In a recognition information controlling process, the relationship between the viewpoint (in an area) and/or its movement, and recognition information (words, sentences, grammar, etc.) is obtained as weight P(). When the user pronounces a word (or sentence), the speech is inputted and A/D converted via a speech input unit. Next, in a speech recognition process, a speech recognition probability PS() is obtained. Finally, speech recognition is performed on the basis of a product of the weight P() and the speech recognition probability PS(). Accordingly, classes of the recognition information are controlled in accordance with the movement of the user's viewpoint, thereby improving the speech recognition probability and the speed of recognition.

48 Claims, 21 Drawing Sheets

FIG. 10

| WEIGHT POSITION | | P (O) | P (A) | P (B) | OPERATION |
|---|---|---|---|---|---|
| (1) | X1 | 0 | | | |
| (2) | X2 | 1 | | | LOOK AT SPEECH INPUT CONTROL PANEL |
| (3) | X3 | 1 | | | PRONOUNCE "START" WHILE LOOKING AT SPEECH INPUT CONTROL PANEL |
| (4) | X4 | 1 | 0 | 0 | WIEWPOINT DETECTION AREAS ARE RALATED TO RESPECTIVE DICTIONARIES |
| (5) | X5 | 0 | 1 | 0 | LOOK AT ICON FOR CALENDAR |
| (6) | X6 | 0 | 1 | 0 | PRONOUNCE "MAY, 1994" |
| (7) | X7 | 0 | 1 | 0 | CALENDAR WINDOW IS OPENED, ITS AREA IS RELATED TO DICTIONARY FOR CALENDAR |
| (8) | X8 | 0 | 1 | 0 | PRONOUNCE "DECEMBER, 2001" |
| (9) | X9 | 0 | 1 | 0 | PRONOUNCE "QUIT" |
| (10) | X10 | 0 | 0 | 0 | CALENDAR APPLICATION IS QUITTED |
| (11) | X11 | 0 | 0 | 1 | LOOK AT ICON FOR CALCULATOR |
| (12) | X12 | 0 | 0 | 1 | PRONOUNCE "2+3=" |
| (13) | X13 | 0 | 0 | 1 | PRONOUNCE "QUIT" |
| (14) | X14 | 0 | 0 | 0 | CALCULATOR APPLICATION IS QUITTED |
| (15) | X15 | 1 | 0 | 0 | LOOK AT SPEECH INPUT CONTROL PANEL |
| (16) | X16 | 1 | 0 | 0 | PRONOUNCE "QUIT" |
| (17) | X17 | 0 | | | |

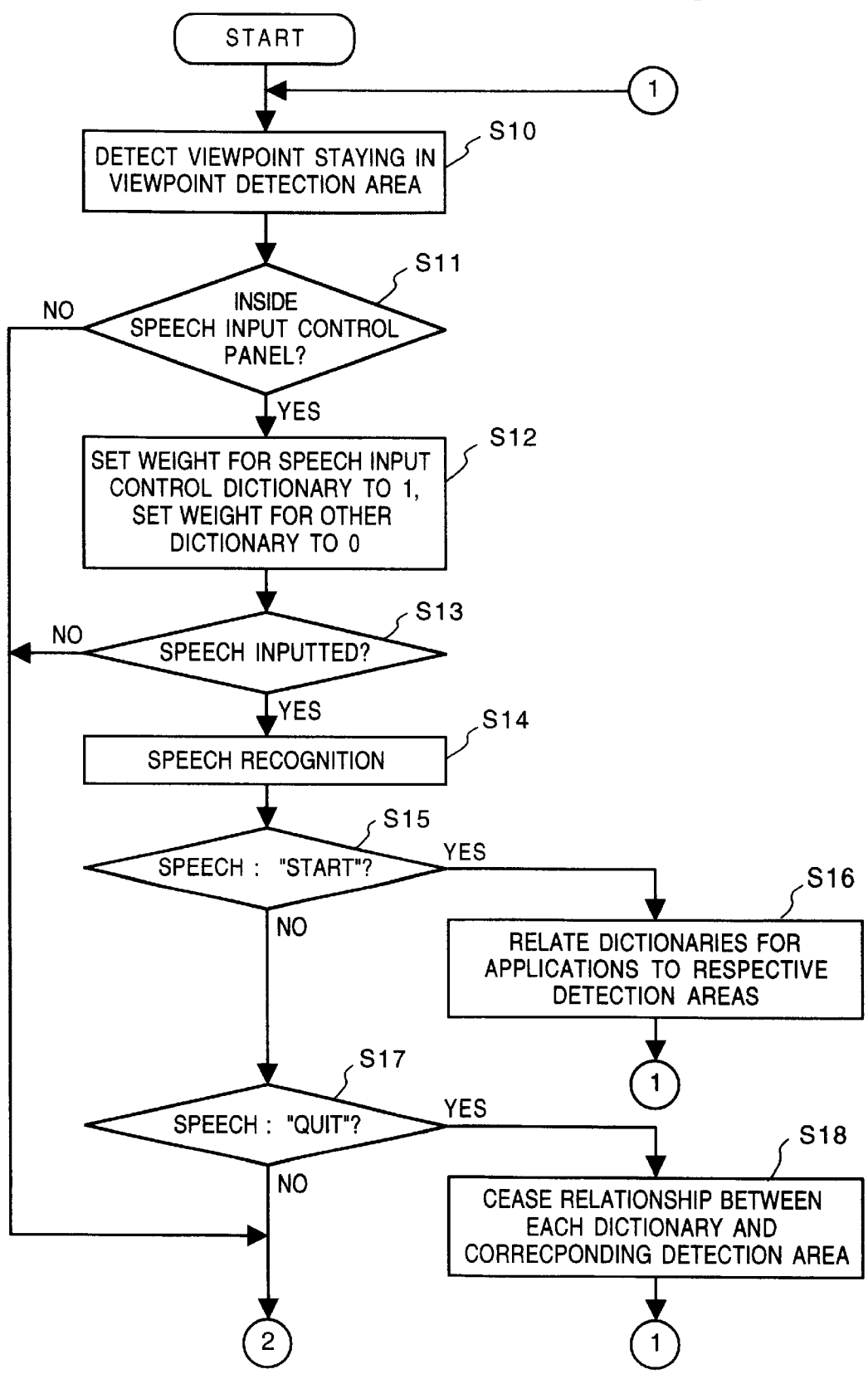
F I G. 11

SPEECH RECOGNITION APPARATUS AND METHOD AND A COMPUTER USABLE MEDIUM FOR SELECTING AN APPLICATION IN ACCORDANCE WITH THE VIEWPOINT OF A USER

Substitute Specification for U.S. Patent Application Ser. No. 08/524,949, filed Sep. 8, 1995

BACKGROUND OF THE INVENTION

The present invention relates to a speech recognition apparatus employing a speech recognition method performed in accordance with the viewpoint (point where the user's eyes are focused on the display screen) of a user and an information processing apparatus using the speech recognition apparatus.

A method for improving the precision of speech recognition by controlling the recognition information contained in communicative information has been proposed. The "recognition information" is managed by a recognition apparatus and includes data consisting of words, sentences, grammar, and frequency of use thereof. For example, in a calendar application, when a speech "iər" (phonetic symbol) is inputted, if a higher weight is put on a word "year" than a word "ear", the word "year" is more likely chosen. In a likewise manner, the recognition information can be controlled. Further, a method for improving the recognition ability of a recognition apparatus by using image information in speech recognition has been also proposed.

However, in the aforesaid speech recognition method, neither a user's visual direction nor application is taken into consideration. Thus, the recognition information is controlled in accordance with a communicative situation at best. Therefore, the precision of speech recognition greatly depends on the precision of control of the communicative situation. In a case where the recognition information is controlled depending upon communicative situations, it is difficult to quickly make the recognition correspond to different users' manners (communicative situation) which differs from person to person, resulting in the lack of achievement of an adequate speech recognition level and recognition speed cannot be improved.

SUMMARY OF THE INVENTION

The present invention has been made in consideration of the above situation, and has as its object to provide a speech recognition apparatus which has an improved speech recognition level and recognition speed by properly taking a user's visual direction and application into consideration by detecting movement of a viewpoint of the user and controlling recognition information on the basis of the user's visual direction and application.

Another object of the present invention is to provide an information processing apparatus having a speech recognition apparatus which achieves the aforesaid speech recognition as well as executes applications on the basis of the results of recognizing inputted speech.

Still another object of the present invention is to improve the speech recognition level by enabling the change of different classes of recognition information for speech recognition processing on the basis of a viewpoint of a user.

It is still another object of the present invention to improve the speech recognition level by putting different weights on different classes of recognition information for speech recognition processing on the basis of a viewpoint of a user and performing speech recognition by using the weighted recognition information.

It is still another object of the present invention to enable the control of recognition processing on the basis of the relationship between a viewpoint and positions of displayed images, such as icons of applications, on a display screen.

It is still another object of the present invention to enable to the execution of a predetermined process by selecting an application in accordance with a class of recognition information which is used to obtain a recognition result in speech recognition processing performed on the basis of a viewpoint of a user, and by supplying the recognition result to the selected application.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 10 is a table showing the relationship between viewpoints and weights to be applied;

FIG. 11 is a flowchart explaining an operational sequence according to the first embodiment;

DETAILED DESCRIPTION OF THE PREFERRED EMBODIMENTS

Preferred embodiments of the present invention will be described in detail in accordance with the accompanying drawings.

<First Embodiment>

Figure 1:
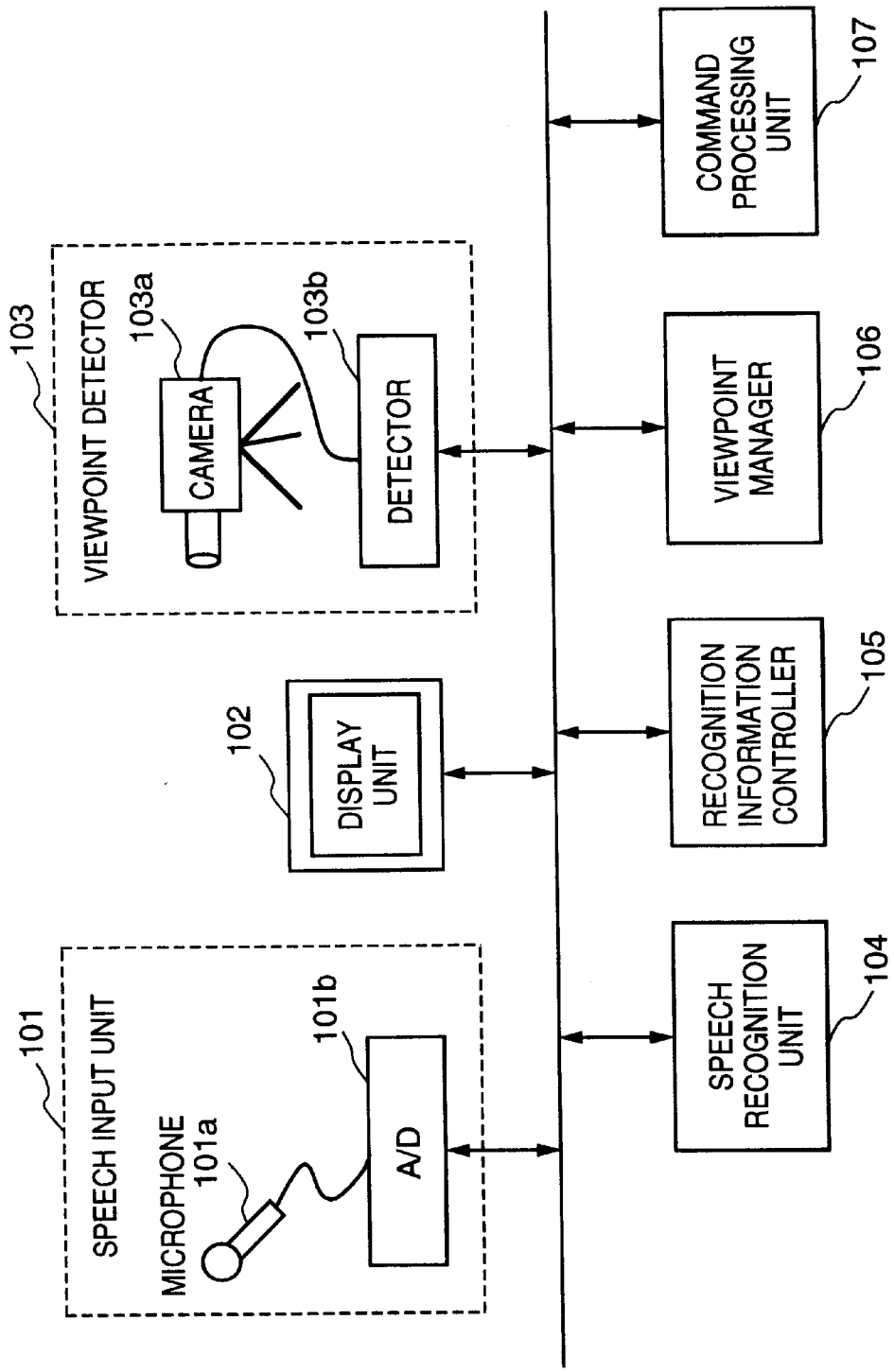
FIG. 1 is a block diagram showing a configuration of an information processing apparatus according to a first embodiment.

FIG. 1 is a block diagram showing a brief configuration of an information processing apparatus according to a first embodiment. In FIG. 1, reference numeral 101 denotes a speech input unit including a microphone 101a and an A/D converter 101b; 102 denotes a display unit for displaying various kinds of icons and a viewpoint (or area); 103 denotes a viewpoint detector having a detector 103b which detects a viewpoint on the basis of an image sensed by a camera 103a or the like; and 104 denotes a speech recognition unit for recognizing input speech using a selected class of recognition information. In the first embodiment, classes of the recognition information are weighted dictionaries, containing words, sentences, grammar, and frequency of use thereof, corresponding to different kinds of applications.

Further, reference numeral 105 denotes a recognition information controller for controlling recognition information (i.e., selecting one of the dictionaries) on the basis of a detected result of a viewpoint by a viewpoint manager 106; 106 denotes the viewpoint manager for managing movement of a viewpoint (how long and at which point of the display unit 102 a viewpoint is fixed, and so on) detected by the viewpoint detector 103; 107 denotes a command processing unit for performing various kinds of processes on the basis of a command detected in speech recognition.

In the configuration shown in FIG. 1, each of the speech recognition unit 104, the recognition information controller 105, the viewpoint manager 106, and the command processing unit 107 can comprise a CPU, a ROM, and a RAM (not shown) so as to achieve the desired functions, or a single CPU can be used for controlling the aforesaid four units to realize the same functions. When a single CPU is used, the functions of each unit are obtained by executing a control program stored in the ROM 111 by CPU 110 as shown in FIG. 26. The ROM 111 stores a control program for realizing a control sequence shown in a flowchart which will be explained later. Further, RAM 112 provides a work area to the CPU 110 when it performs various kinds of control. A control program can be loaded to the RAM 112 from a floppy disk 114 or the like and executed by the CPU 110. This process will be explained later.

Figure 2:
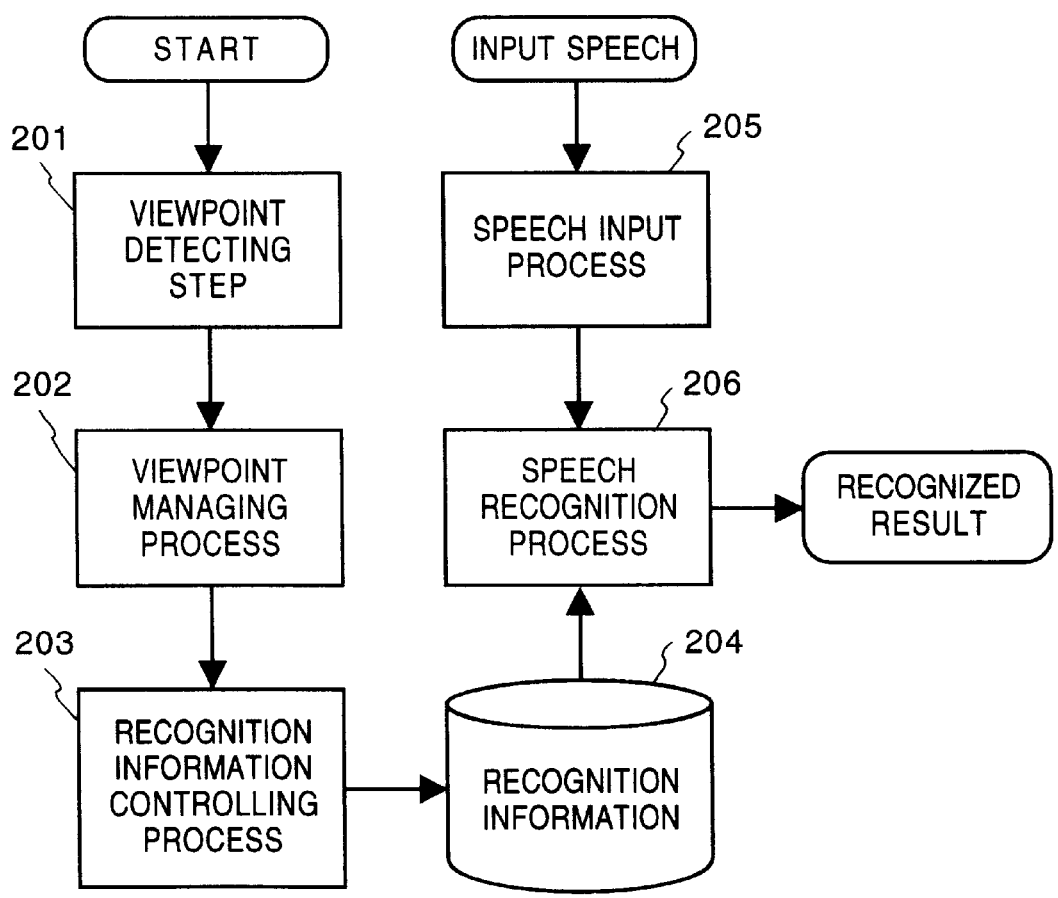
FIG. 2 is a flowchart explaining an operation of speech recognition processing according to the first embodiment.

Next, speech recognition processing by the information processing apparatus of the first embodiment will be explained. The speech recognition processing in the first embodiment is performed by the configuration denoted by reference numerals 101 to 106 as above. FIG. 2 is a flowchart explaining an operation of speech recognition processing according to the first embodiment.

First, when a user turns the power on for the information processing apparatus, a viewpoint of the user is detected by using the viewpoint detector 103 in viewpoint detecting process 201. Next, at which position (or an area) on the display unit 102 or its vicinity and how long the viewpoint detected in the viewpoint detecting process 201 is fixed is obtained by the viewpoint manager 106 in viewpoint managing process 202. Then, the obtained viewpoint and its trace are displayed on the display unit 102.

Thereafter, on the basis of the relationship between the viewpoint (area), its movement, and recognition information (words, sentences, grammar, and frequency of use thereof), the weight P() is determined in recognition information controlling process 203. As described above, the weight P() for a class of recognition information 204 is controlled in accordance with a viewpoint and its movement.

Meanwhile, when the user pronounces a word (or a sentence), the speech is inputted and A/D converted via the speech input unit 101 in speech input process 205. Then, a speech recognition probability PS() is obtained in speech recognition process 206, and a product of the weight P() and the speech recognition probability PS() is obtained as a final recognition probability PT() of the word (or sentence).

In the first embodiment, a plurality of dictionaries are used as different classes of the recognition information, and one of the plurality of dictionaries is selected by putting weight "1" on a dictionary selected in accordance with the movement of the user's viewpoint, and putting weight "0" on other dictionaries. It should be noted that, in the first embodiment, weight is either "1" or "0", and thus the speech recognition processing works as if different classes of recognition information are switched.

Figure 3:
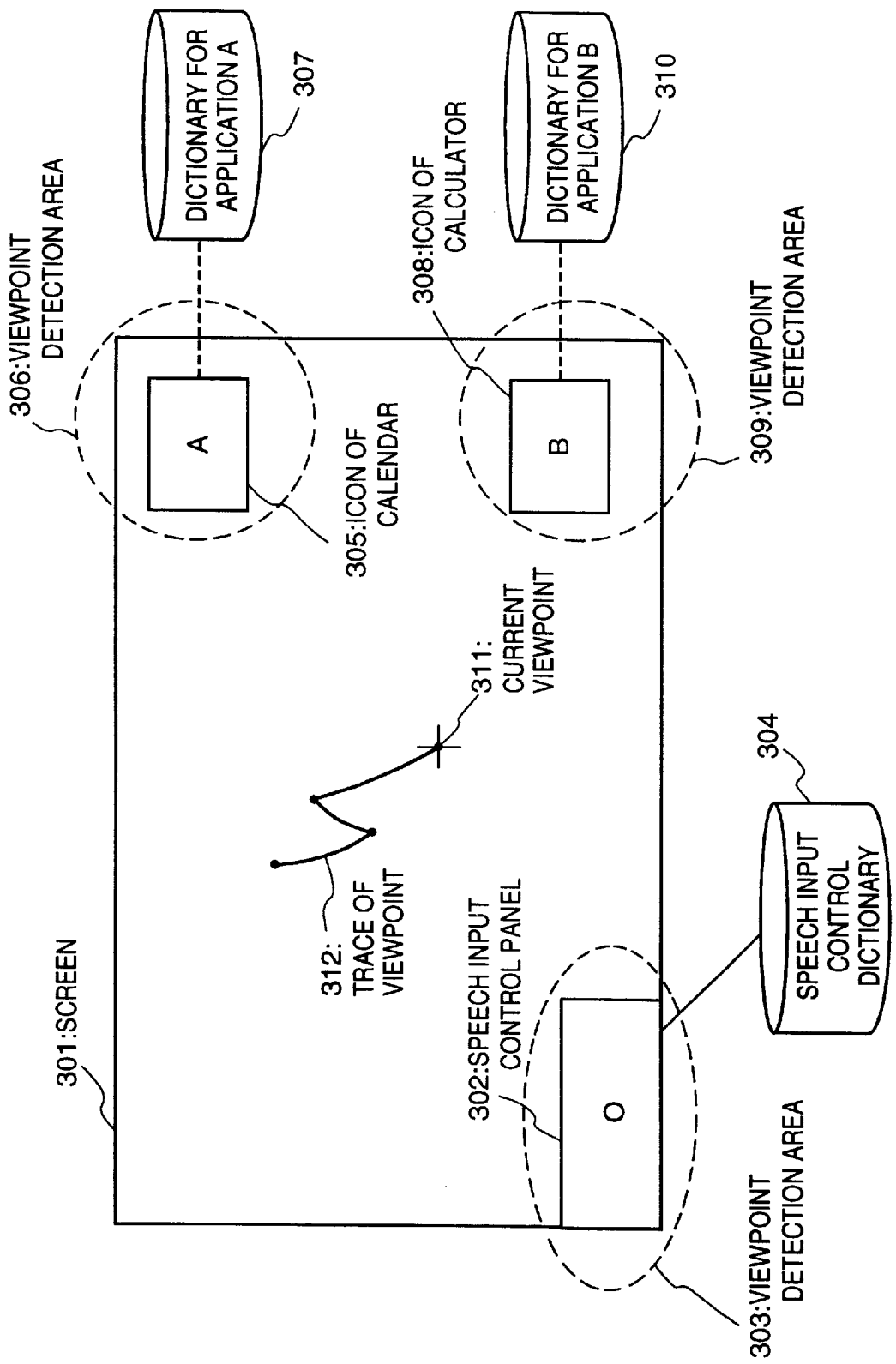
FIG. 3 is a graphical representation of an example of an operation according to the first embodiment.

As for the aforesaid operation, it will be explained more specifically using an example. FIG. 3 is an initial state of the information processing apparatus when a user turns on the apparatus. In FIG. 3, reference numeral 301 denotes a screen of the display unit 102. Further, reference numeral 302 denotes a speech input control panel; and 305 and 308 denote icons of an application A (e.g., calendar) and an application B (e.g., calculator), respectively.

Further, reference numerals 303, 306, and 309 denote viewpoint detection areas for the icons 302, 305, and 308, respectively. The viewpoint detection area 303 shows the viewpoint detection area for the speech input control panel, and when a viewpoint stays inside of the viewpoint detection area 303, it is determined that the user is interested in the speech input control panel. Likewise, the viewpoint detection areas 306 and 309 are the viewpoint detection areas for the application A and the application B, respectively. It should be noted that the viewpoint detection area demarcations are not displayed on the screen 301. Further, reference numeral 304 denotes a speech input control dictionary; 307 denotes a dictionary for the application A (calendar); and 310 denotes a dictionary for the application B (calculator).

Reference numeral 311 denotes a current viewpoint; and 312 denotes a trace of a viewpoint. A user's viewpoint during a predetermined past time period (e.g., for 1 sec.) is displayed. Movement of a viewpoint sometimes stops at positions (expressed with black points in FIG. 3) and sometimes jumps (expressed with curves in FIG. 3). These kinds of movement are repeated alternatively.

Figure 4:
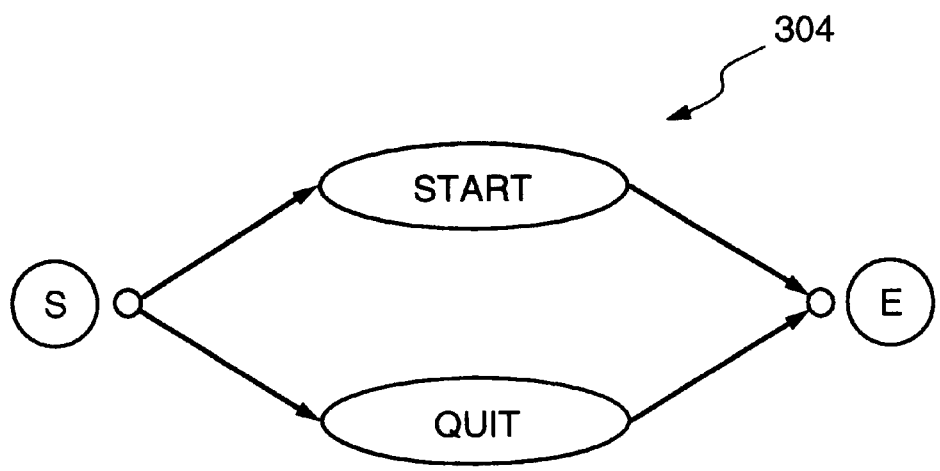
FIG. 4 is a graphical representation showing the contents of a speech input control dictionary.
Figure 5:
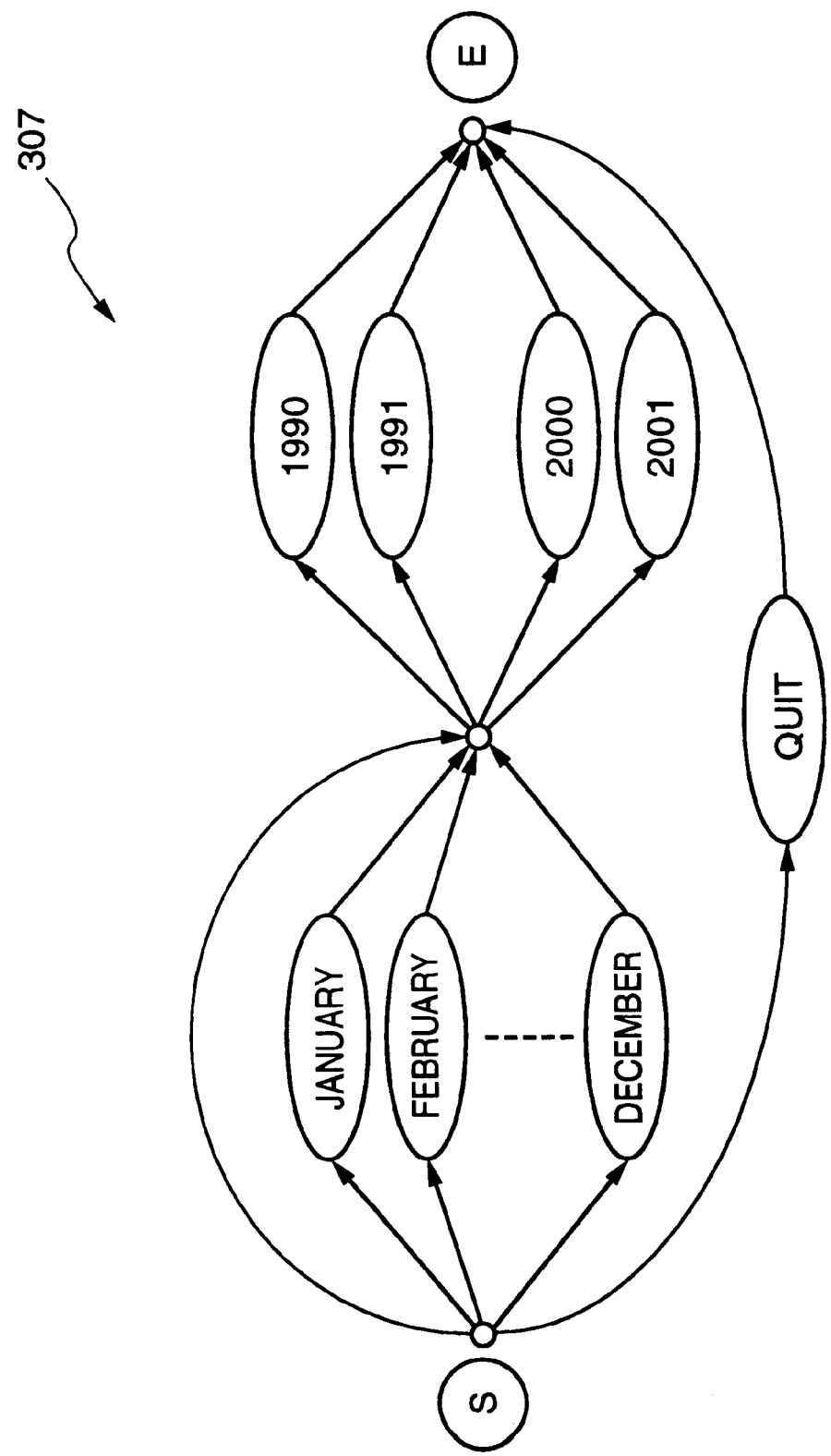
FIG. 5 is a graphical representation showing the contents of a dictionary for an application A.
Figure 6:
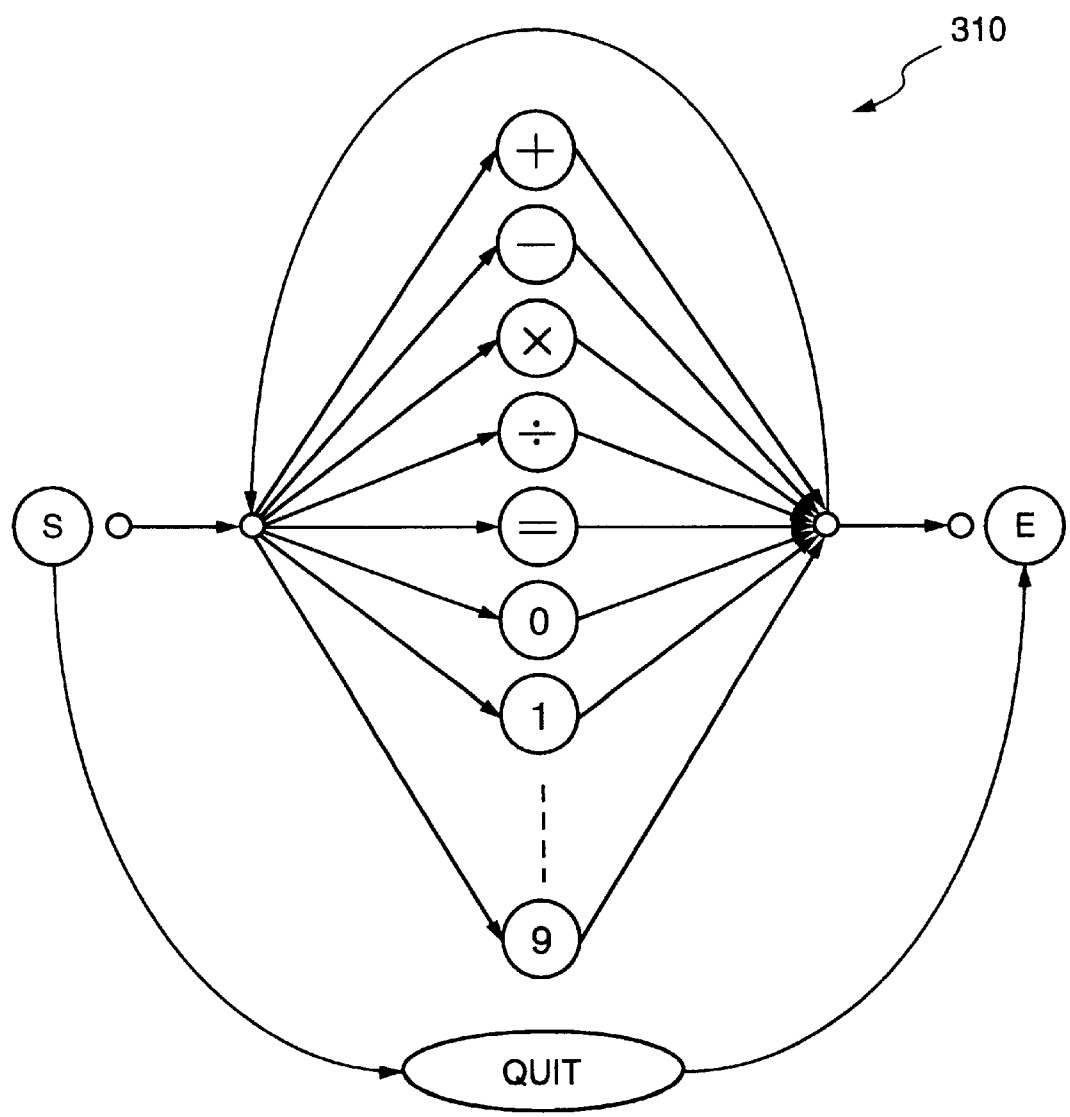
FIG. 6 is a graphical representation showing the contents of a dictionary for an application B.

FIGS. 4 to 6 are graphical representations showing the contents of each dictionary. FIG. 4 is a graphical representation showing the contents of the speech input control dictionary 304 whose recognition words are "start~and "quit". FIG. 5 is a graphical representation showing the contents of the dictionary for the application A (calendar) 307 whose recognition words (or sentences) are, for example, "1990" (nineteen-ninety), "May, 1994" (may nineteen-ninety-four), and "quit". FIG. 6 is a graphical representation showing the contents of the dictionary for the application B (calculator) 310 whose recognition words (or sentences) are "3+6=" (three plus six equals to) and "quit", for example.

Figure 7:
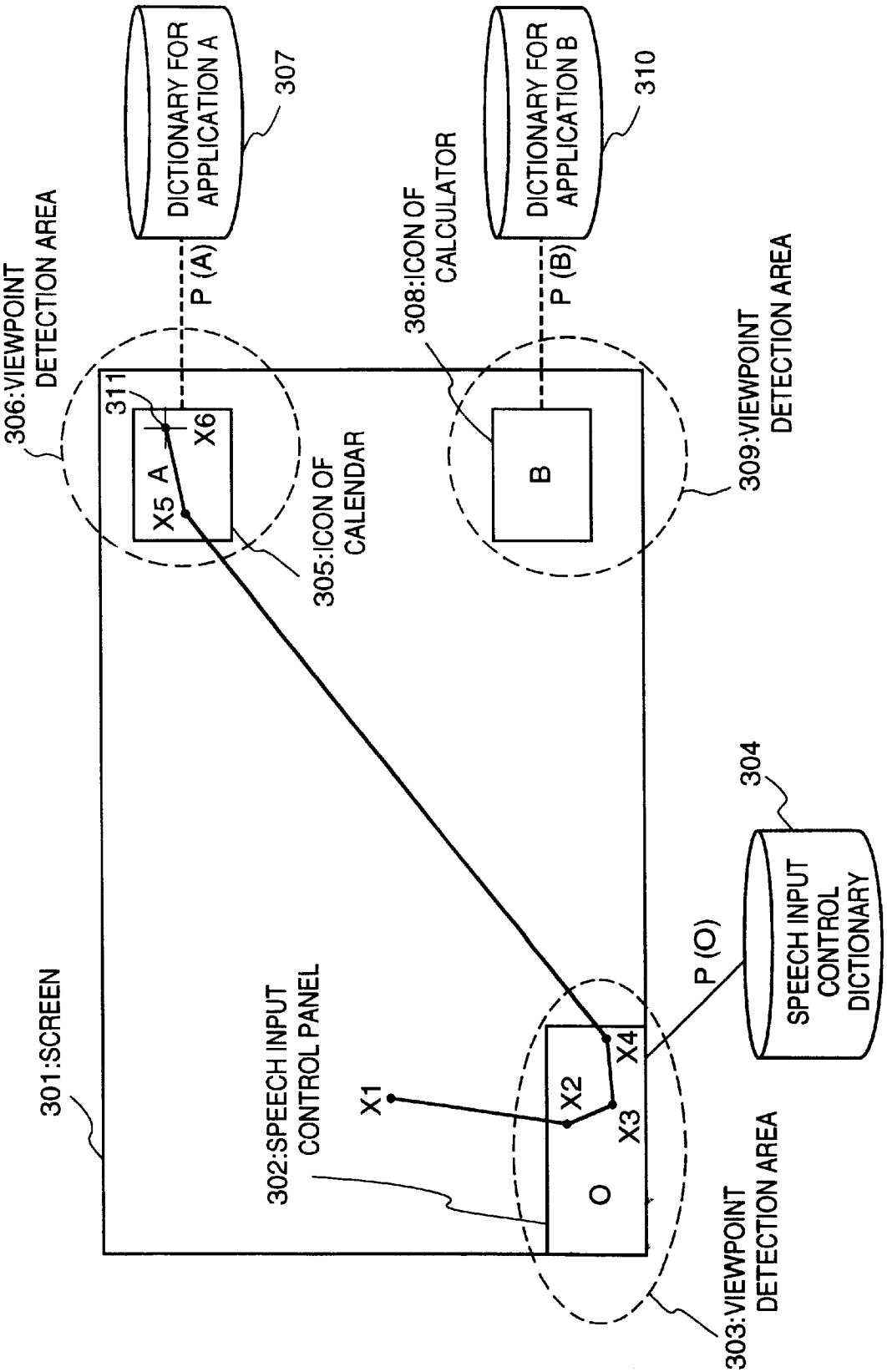
FIG. 7 shows a picture on a display screen in an example of an operation according to the first embodiment.
Figure 8:
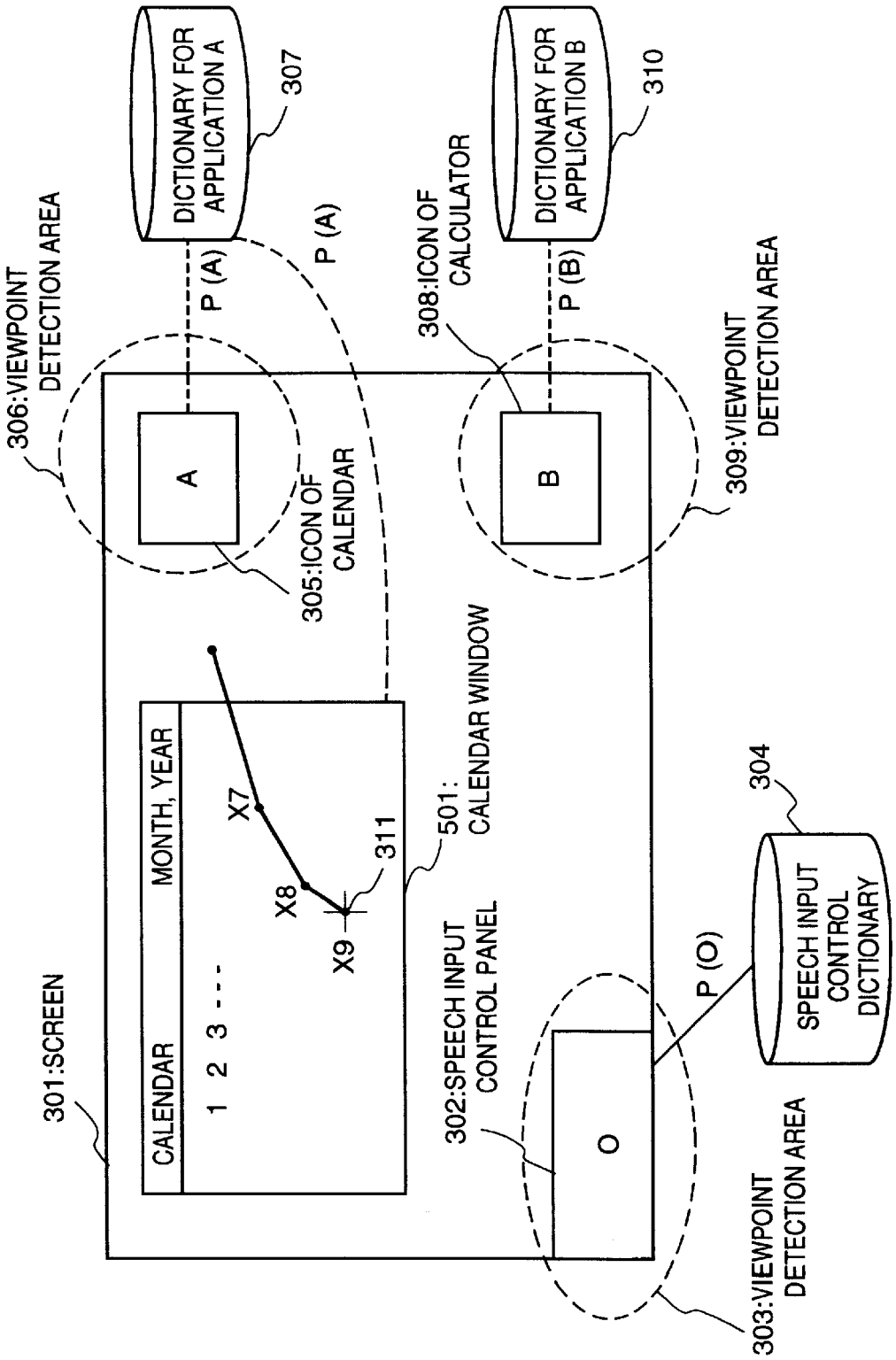
FIG. 8 shows a picture on a display screen in an example of an operation according to the first embodiment.
Figure 9:
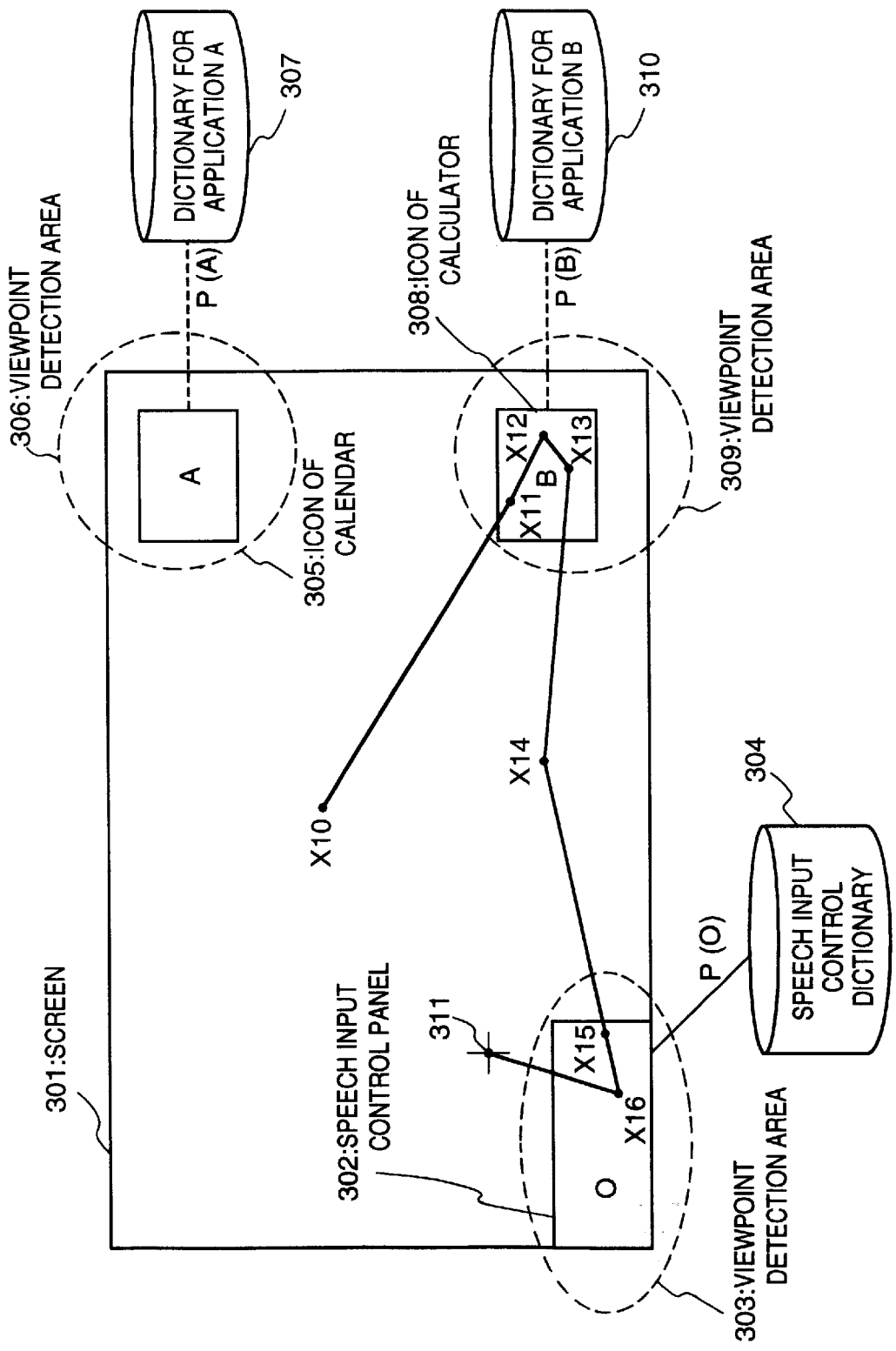
FIG. 9 shows a picture on a display screen in an example of an operation according to the first embodiment.
Figure 12:
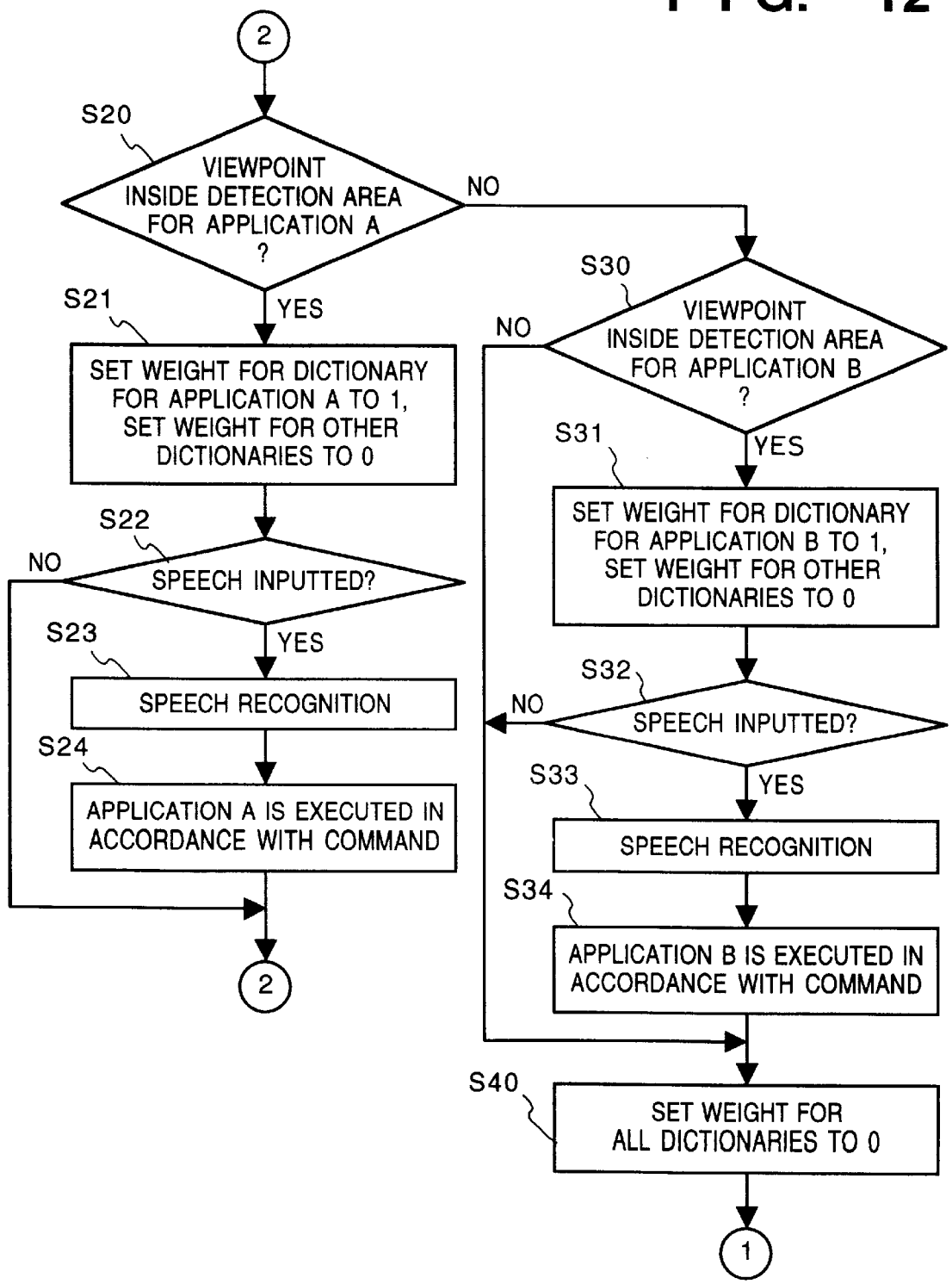
FIG. 12 is a flowchart explaining the operational sequence according to the first embodiment.

Next, referring to FIGS. 7 to 12, examples of operations will be explained. FIGS. 7 to 9 show pictures on the screen in examples of operations according to the first embodiment. Further, FIG. 10 is a table showing the relationship between viewpoints and weights to be applied, and FIGS. 11 and 12 are flowcharts explaining an operational sequence according to the first embodiment. Step numbers which will be used below correspond to those in the flowcharts in FIGS. 11 and 12.

After power is supplied to the information processing apparatus, a viewpoint is detected (at a point X1 at this time), and the detected point is displayed on the screen (FIG. 7). Under a current situation, only the speech input recognition dictionary 304 is related to the viewpoint detection area for the speech input control panel 303 with weight of P(O)=0, and neither the dictionaries for the application A nor the application B are related to their respective viewpoint detection areas (FIG. 10(1)). A detecting process for detecting whether or not the viewpoint stays in the viewpoint detection areas is performed a plurality of times per second (e.g., 10 times/sec.).

Then, the viewpoint is moved to a position X2 inside the speech input control panel 302 (FIG. 7). If the viewpoint stays in the viewpoint detection area for the speech input control panel 303 more than a predetermined number of times (e.g., three times) during a predetermined time period (e.g., 1 sec.), then the viewpoint manager 106 determines that the user selected the speech input control panel 302 (at steps S10 and S11). Accordingly, the speech input recognition control dictionary 304 is related to the viewpoint recognition area for the speech input control panel 303 with weight of P(O)=1 (FIG. 10(2), at step S12). Note that, in the process at step S12 at this point, the dictionaries of other applications are not related to the corresponding viewpoint detection areas, and thus no weight is put on these dictionaries.

Thereafter, the user pronounces a word "start" while watching the speech input control panel 302 (FIG. 10(3)), and a speech recognition probability PS() for each word in the speech input control dictionary 304 which is related to the viewpoint detection area for the speech input control panel 303 is determined as follows (it is possible to employ a known method in speech recognition).
PS(start)=0.7
PS(quit)=0.3
Then, the word recognition probabilities (PT()=p()×PS()) are, $$PT(start)=P(O)\times PS(start)=1\times 0.7=0.7$$

$$PT(quit)=P(O)\times PS(quit)=1\times 0.3=0.3$$

By selecting a word having the greatest PT() as a recognized word, "start" is selected, thus the speech input control is to be performed. As a result, the viewpoint detection area for the application A 306 is related to the dictionary for the application A 307 with weight of P(A)=0, and the viewpoint detection area for the application B 309 is related to the dictionary for the application B 310 with weight of P(B)=0 (FIG. (4), at steps S14 to S16).

Then, the viewpoint is moved to a position X5 in the icon of the calendar (FIG. 7). If the viewpoint stays in the viewpoint detection area for the application A 306 more than a predetermined number of times (e.g., three times) during a predetermined time period (e.g., 1 sec.), then the viewpoint manager 106 determines that the user selected the icon of the calendar 305 (at steps S10 and S20). Accordingly, the dictionary for the application A 307 is related to the viewpoint detection area for the application A 306 with weight of P(A)=1, and words (or sentences) in the dictionary shown in FIG. 5 can be used in the speech recognition processing. Further, the weight between the dictionary for the application B 310 and the viewpoint detection area for the application B 309 becomes P(B)=0, and the weight between the speech input control dictionary 304 and the viewpoint detection area for the speech input control panel 303 becomes P(O)=0 (FIG. 10(5), at step S21).

Then, while watching the viewpoint detection area 306 for the application A, the user pronounces "May, 1994" (may, nineteen-ninety-four) (FIG. 10(6)). Accordingly, a speech recognition probability PS() of each word (or sentence) in the dictionary for the application A 307, which is related to the viewpoint detection area for the application A 306, is determined as follows.
PS(January, 1990)=0.1
. . .
PS(May, 1994)=0.5
. . .
PS(quit)=0.01 Then, word recognition probabilities PT()=P()×PS() become, $$PT(January, 1990)=P(A)\times PS(January, 1990)=0.1$$

$$PT(May, 1994)=P(A)\times PS(May, 1994)=0.5$$

. . .

$$PT(quit)=P(A)\times PS(quit)=0.01$$

By selecting a word having the greatest PT(), "May, 1994" is selected as a recognized word. Accordingly, a calendar window 501 of the May 1994 is opened (FIG. 8), and the dictionary for the application A 307 is related to a viewpoint detection area for the calendar window 501 with a weight of P(A)=1" (FIG. 10(7), at steps S22 to S24). In this example, the size of the displayed area of the calendar window 501 and the viewpoint detection area for the calendar window are identical. However, they do not always have to be the same size and can have different areas as for the icon of the calendar 305 and the viewpoint detection area for the calendar 306.

Next, while watching the calendar window 501, the user pronounces "December, 2001" (december, twenty-o-one) (FIG. 10(8)). Since the calendar window is a part of the viewpoint detection area for the application A, the processes step S20 to step S24 are repeated.

At step S23, a speech recognition probability PS() of each word in the dictionary for the application A 307 can be determined as follows.
PS(January, 1990)=0.1
. . .
PS(December, 2001)=0.5
. . .
PS(quit)=0.1
Accordingly, word recognition probabilities, PT()=P()×PS(), are, $$PT(January, 1990)=P(A)\times PS(January, 1990)=0.1$$

. . .

$$PT(December, 2001)=P(A)\times PS(December, 2001)=0.5$$

. . .

$$PT(quit)=P(A)\times PS(quit)=0.1$$

By selecting a word having the greatest PT(), "December, 2001" is selected as a recognized word, and the application A is executed in accordance with a command, or the recognized word, at step S24. Thus, a calendar window changes from the one for May, 1994 to the one for December, 2001. Next, while watching the viewpoint detection area for the calendar window 501, the user pronounces "quit" (FIG. 10(9)). Accordingly, a speech recognition probability PS() for each word in the dictionary for the application A 307 is determined as follows.

PS(January, 1990)=0.1

. . .

PS(quit)=0.6

Then, word recognition probabilities PT()=P()×PS() are,

PT(January. 1990)=P(A)×PS(January, 1990)=0.1

. . .

PT(quit)=P(A)×PS(quit)=0.6

By selecting a word having the greatest PT(), "quit" is selected as a recognized word. Accordingly, the calendar application is closed as well as the calendar window 501 being closed. If the viewpoint is at a position X10 (FIG. 9) at this time, since it does not belong to the viewpoint detection area for the speech input control panel 303, nor does it belong to the application A 306, nor for the application B 309, the weight becomes P(O)=P(A)=P(B)=0 (FIG. 10(10)).

Next, the viewpoint is moved to a position Xll in the icon of the calculator 308 (FIG. 9). If the viewpoint stays in the viewpoint detection area for the application B 309 more than a predetermined number of times (e.g., three times) during a predetermined time period (e.g., 1 sec.), then the viewpoint manager 106 determines that the user selected the calculator (steps S10 and S30). Accordingly, the dictionary for the application B 310 is related to the viewpoint detection area for the application B 309 with weight of P(B)=1, and words (or sentences or arithmetic equations) in the dictionary shown in FIG. 6 can be used in the speech recognition processing. Further, the weight between the dictionary for the application A 307 and the viewpoint detection area for the application A 306 becomes P(A)=0, and the weight between the speech input control dictionary 304 and the viewpoint detection area for the speech input control panel 303 becomes P(O)=0 (FIG. 10(11), at step S31). In this case, when P(B)=1. and the information processing apparatus of the first embodiment can recognize arithmetic equations and a word "quit" in the speech recognition processing.

Next, while watching the viewpoint detection area for the application B 309, the user pronounces "82+3=" (two plus three equals to) (FIG. 10 (12)). Accordingly, speech recognition probabilities PS() of the arithmetic equations and a word "quit" in the dictionary for the application B 310, which is related to the viewpoint detection area for the application B 309, are determined as follows.

PS(1+1=)=0.1

. . .

PS(2+3=)=0.5

. . .

PS(quit)=0.01

. . .

Accordingly, word (arithmetic equation) recognition probabilities, PT()=P()×PS(), become,

PT(1+1=)=P(B)×PS(1+1=)=0.1

. . .

PT(2+3=)=P(B)×PS(2+3=)=0.5

. . .

PT(quit)=P(B)×PS(quit)=0.01

By selecting the word (arithmetic equation) having the greatest PT ( ), "2+3=" is selected as a recognized word and the calculator application is executed. Accordingly, a calculator window is opened (not shown), and a calculated result "5" is displayed (at steps S32 to S34 ). The calculator window is related to the dictionary for the application B 310, in a manner similar to the case for the calendar window. Then, while watching the viewpoint detection area for the application B 309 or the calculator window, the user pronounces "quit" (FIG. 10(13)).

Accordingly, the speech recognition probabilities PS() of the arithmetic equations and a word "quit" in the dictionary for the application B 310, which is connected to the viewpoint detection area for the application B 309, become as follows.

PS(1+1=)=0.1

. . .

PS(quit)=0.6

Then, the recognition probabilities PT()=Pt)×PS() become,

PT(1+1=)=P(B)×PS(1+1=)=0.1

. . .

PT(quit)=P(B)×PS(quit)=0.6.

By selecting a word (or arithmetic equation) having the greatest PT(), "quit" is selected as a recognized word. Accordingly, the calculator application is closed and the calculator window is also closed. If the viewpoint is at a position X14 (FIG. 9) at this time, since it does not belong to the viewpoint detection area for the speech input control panel 303, the application A 306, nor the application A 306, nor the application B 309, the weight becomes P(O)=P(A)= P(B)=0 (FIG. 10(14), at step S40).

Then, the viewpoint is moved to a position X15 in the speech input control panel 302 (FIG. 9). If the viewpoint stays in the viewpoint detection area for the speech input control panel 303 more than a predetermined number of times (e.g., three times) during a predetermined time period (e.g., 1 sec.), then the viewpoint manager 106 determines that the user selected the speech input control panel 302. Accordingly, the weight for each dictionary becomes P(O)= 1, P(A)=0, P(B)=0 (FIG. 10(15), at step S12).

Thereafter, the user pronounces a word "quit" while watching the speech input control panel 302 (FIG. 10(16)), and a speech recognition probability PS() for each word in the speech input control dictionary 304, which is related to the viewpoint detection area for the speech input control panel 303, are determined as follows.

PS(start)=0.3

PS(quit)=0.7

Then, the word recognition probabilities (PT()=P()×PS()) are,

PT(start)=P(O)×PS(start)=1×0.3=0.3

PT(quit)=P(O)×PS(quit)=1×0.7=0.7.

By selecting a word having the greatest PT() as a recognized word, "quit" is selected and executed.

As a result, the relationship between the viewpoint detection area for the application A 306 and the dictionary for the application A 307, as well as the relationship between the viewpoint detection area 309 and the dictionary 310 both for the application B cease (FIG. 10(17), at steps S17 and S18).

According to the first embodiment as described above, classes of the recognition information are automatically switched. Further, it is possible to control the application so that, if a user pronounces a word "quit", when the user is looking at the icon of the calendar, the calendar application is terminated, and when the user is looking at the icon of the calculator, the calculator application is terminated.

Therefore, according to the first embodiment, on the basis of a viewpoint which stayed inside a viewpoint detection area set on the display screen and its vicinity, a dictionary for speech recognition (recognition information) which is related to the viewpoint detection area is selected. As a result, dictionaries used for speech recognition are switched properly, thus improving the speech recognition level and the speech recognition speed. Further, it is easy to operate the desired application by using speech commands, thus improving operability.

<Second Embodiment>

Next, a second embodiment will be explained. In the first embodiment, a condition for selecting an application is that a viewpoint stays in a predetermined viewpoint detection area more than a predetermined number of times in a predetermined period of time, and the weight P() for a dictionary for the selected application is set to "1", whereas weight P() for a dictionary for the non-selected application is set to "0". In the second embodiment, depending upon how long the viewpoint stays inside a predetermined area, weights P() for each class of the recognition information (dictionary), which is related to an icon or a control button on the display screen, are controlled.

Figure 13:
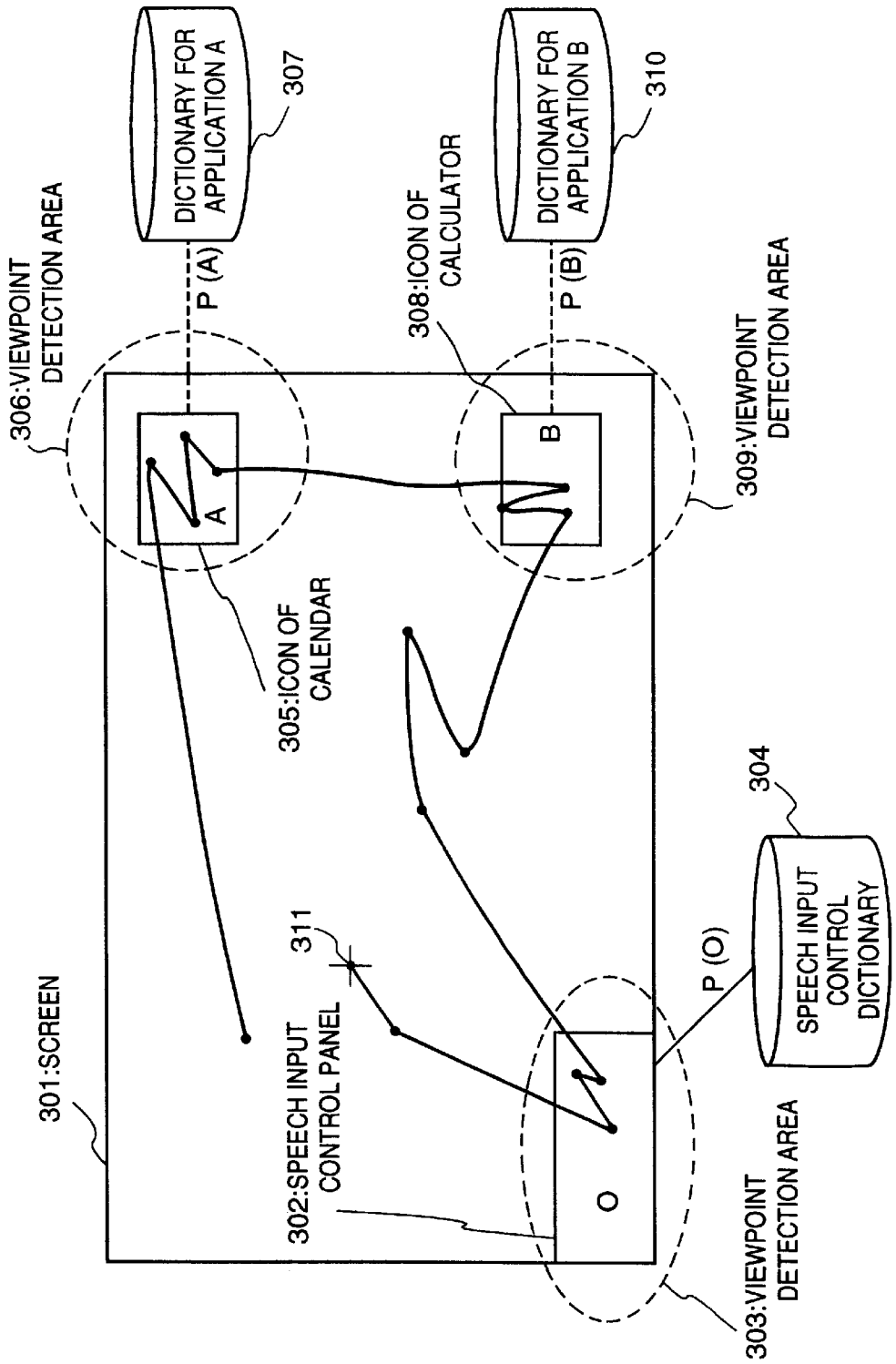
FIG. 13 shows a picture on a display screen in an example of an operation according to a second embodiment.
Figure 14:
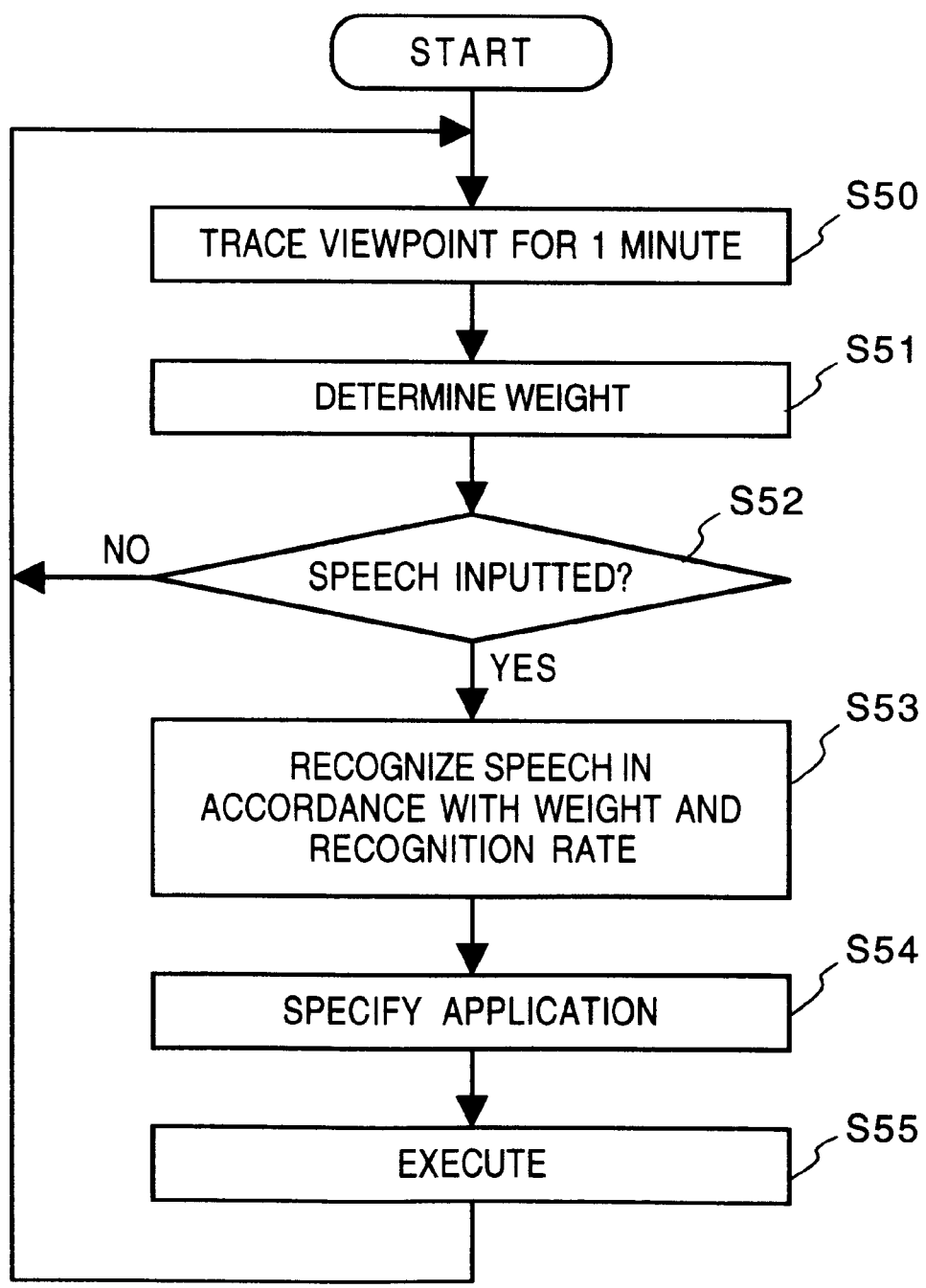
FIG. 14 is a flowchart explaining an operational sequence according to the second embodiment.

FIG. 13 shows a picture on a display screen in an example of an operation according to the second embodiment. More specifically, FIG. 13 shows a trace of a viewpoint after a user has watched the screen 301 for 60 sec. Here, it is assumed that the viewpoint stopped in the viewpoint detection area 303 5 times, 30 times in the viewpoint detection area 306, 15 times in the viewpoint detection area 309, and 10 times in other area. FIG. 14 is a flowchart explaining an operational sequence according to the second embodiment.

In the above example shown in FIG. 13, since the result of tracing the movement of a viewpoint for one minute indicates that the total number of times the viewpoint stayed in any of the predetermined viewpoint detection areas is 50 (=5+30+15), each weight is determined as follows (at steps S50 and S51).

P(O)=5/50=0.1
P(A)=30/50=0.6
P(B)=15/50=0.3

Under this condition, assume that a user pronounces "May, 1990" (may, nineteen-ninety), and weights P() of each word (or sentence or arithmetic equation) are PS(May, 1990)=0.3
PS(19+90)=0.4
PS(other)=equal or less than 0.1

Then a recognition probability PT()=P()×PS() for each word becomes,

PT(May, 1990)=P(A)×PS(May, 1990)=0.6×0.3=0.18

PT(19+90)=P(B)×PS(19+90)=0.3×0.4=0.12

PT(other)=max{P(O), P(A), P(B)}×PS(other)=equal or less than 0.06

By selecting a word (or sentence or arithmetic equation) having the greatest PT() as a recognized word, "May, 1990" is selected (at step S52 and S53). Further, an application related to the dictionary including the recognized word is specified (at step S54), and a predetermined process (e.g., to open a calendar window of May, 1990) is performed (at step S55) According to the second embodiment as described above, by tracing the movement of a viewpoint for a predetermined time period, the weight for classes of the recognition information (dictionaries related to applications) is changed on the basis of the traced result. Therefore, in a case where the viewpoint is moving and does not stay inside a single area, it is possible to stably determine the weight for each dictionary. Accordingly, the user does not have to stop his viewpoint so as to be in a single area, thus increasing operability.

<Third Embodiment>

In the third embodiment, the weight P() for each class of the recognition information related to an icon or a control button is controlled depending upon distances from the position where a viewpoint is to each viewpoint detection area of an application.

Figure 15:
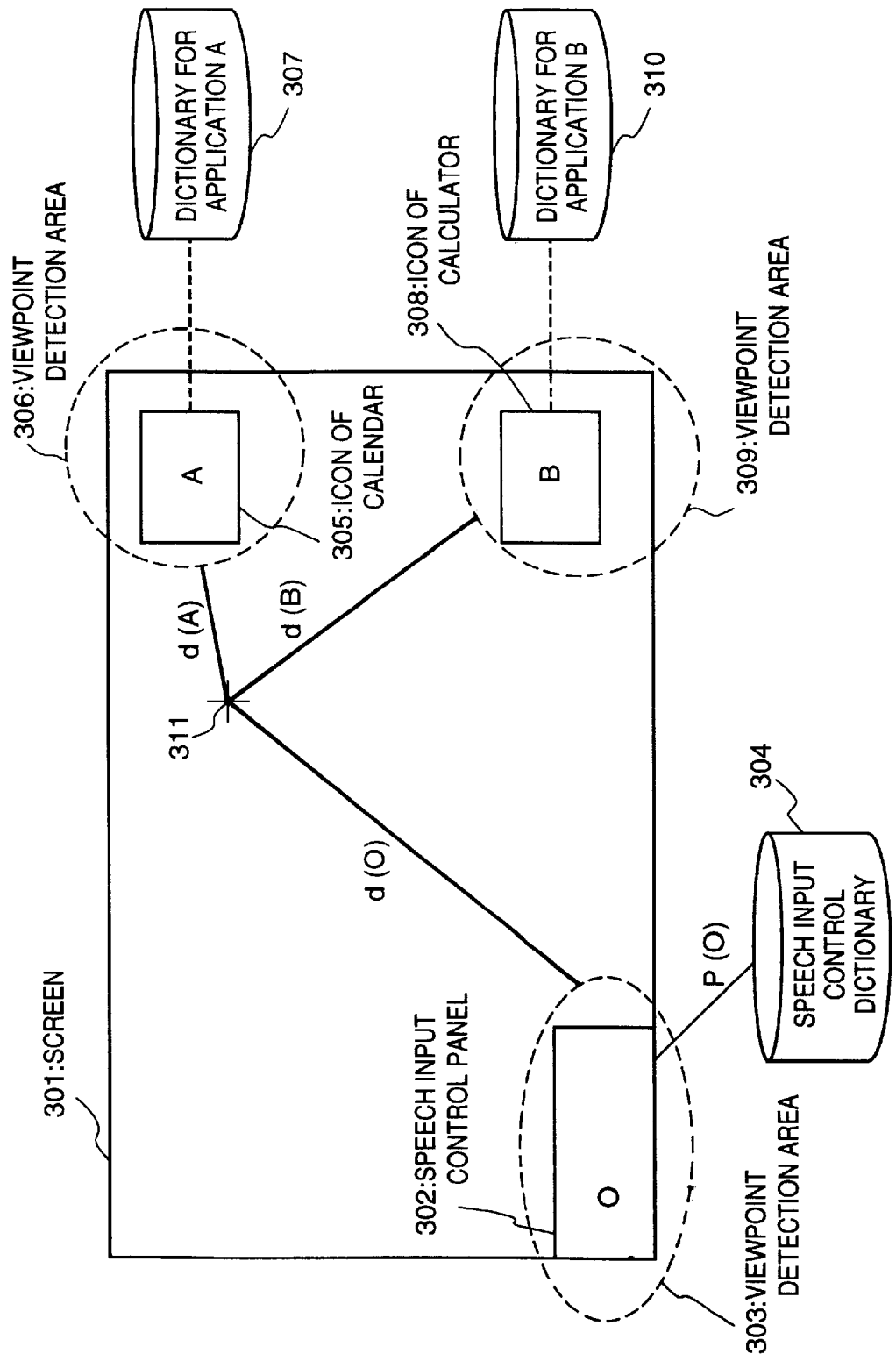
FIG. 15 shows a picture on a display screen in an example of an operation according to a third embodiment.

FIG. 15 shows a picture on a display screen in an example of an operation according to the third embodiment, and reference numeral 311 denotes the current viewpoint of a user. Distances from the viewpoint to the viewpoint detection area for the application A 306, to the viewpoint detection area for the application B 309, and to the viewpoint detection area for the speech input control panel 303 are denoted by d(A), d(B), and d(O), respectively, assuming that d(A)=5 cm, d(B)=20 cm, and d(O)=25 cm.

By determining the weight for a word related to the icon A, B, and the speech input control panel as P(A)=0.5×(d(B)+d(O))/(d(A)+d(B)+d(O)), P(B)=0.5×(d(A)+d(O))/(d(A)+d(B)+d(O)), and P(O)=0.5×(d(A)+d(B))/(d(A)+d(B)+d(O)), then, they become,
P(O)=0.25
P(A)=0.45
P(B)=0.3

If the user pronounces "May, 1990" (may nineteen-ninety), then speech recognition probabilities PS() for words (or a sentence or arithmetic equation) are obtained as
PS(May, 1990)=0.3
PS(19+90)=0.4
PS(other)=equal or less than 0.1

Thus, a word recognition probability PT()=P()+PS() for each word is,

PT(May, 1990)=P(A)×PS(May, 1990)=0.45×0.3=0.135

PT(19+90)=P(B)×PS(19+90)=0.3×0.4=0.12

PT(other)=max{P(O), PA(A), P(B)}×PS(other)=equal or less than 0.045

By selecting a word (or sentence or arithmetic equation) having the greatest PT(), "May 1990" is selected as a recognized word. Further, an application related to the dictionary including the recognized word is specified, and a predetermined process (e.g., opening a calendar window of May, 1990) is performed. In this embodiment, the weight P() is defined as above. However, it can be defined by any function specifying a decrease in weight as the distance becomes large (e.g., P(A)=exp(-d(A))).=P()×PS()

Note that a flowchart according to the third embodiment is similar to that in the second embodiment, and it is omitted.

For instance, the current viewpoint is detected at step S50 in FIG. 14, and the distances from the detected viewpoint to each of the viewpoint detection areas are calculated. Then at step S51, the weight for each dictionary is calculated on the basis of the distances from the detected viewpoint to each of the viewpoint detection areas.

According to the third embodiment as described above. by detecting the distances from a viewpoint and each of viewpoint detection areas, and the weight for each class of the recognition information (dictionaries related to applications) is controlled on the basis of the distances. Therefore, the viewpoint does not always have to be inside of the viewpoint detection areas. In other words, the user does not have to fix his viewpoint inside of a viewpoint detection area, thus increasing operability.

<Fourth Embodiment>

Next, a forth embodiment will be now described. In the first embodiment, depending upon whether or not the viewpoint stays in a viewpoint detection area, the weight for a dictionary related to the corresponding viewpoint detection area where the detected viewpoint is in, is set to "1", and the weights for other dictionaries are set to "0". In the fourth embodiment, a case where, when a viewpoint previously in one of viewpoint detection areas is currently out of the area, the weight for each class of recognition information is not changed immediately, and keep the same weight for a fixed time period, will be explained.

Figure 16A:
FIGS. 16A and 16B are graphs showing changes of weights according to a fourth embodiment.

FIG. 16A is a graph showing change of weight according to a fourth embodiment.

If a time t0 is set to the last minute when a current viewpoint is inside of the viewpoint detection area for the application A 306, then the weight for the dictionary for the application A 307 at t0 is P(A)=1.

As shown in FIG. 16A, if the viewpoint is outside of the viewpoint detection area 306 at time t1, the weight is not changed as long as t1−t0<T (e.g., T=1 sec.), and P(A) remains 1. On the contrary, if the viewpoint is outside of the viewpoint detection area 306 at time t2 and t2−t0≧T, then the weight P(A) is 0.

Figure 16B:
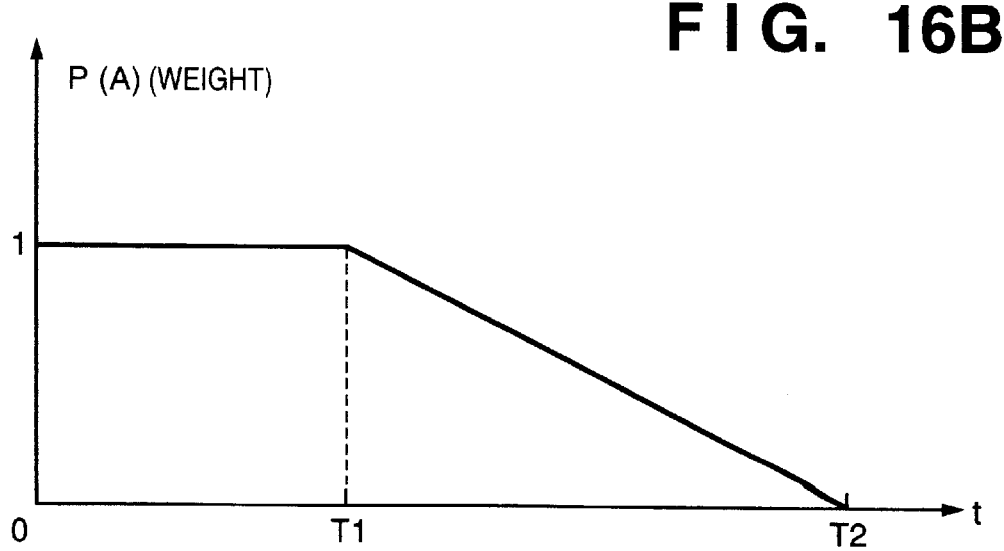

Further, when a viewpoint is moved to another position outside of the viewpoint detection areas, it is possible to gradually change the weight for each class of the recognition information. To do so, the weight for the dictionary for application P(A) is changed by following a graph shown in FIG. 16B, for example. FIG. 16B is another graph showing the change of weight according to a fourth embodiment. In FIG. 16B, predetermined values (e.g., T1=1 sec., T2=3 sec.) are set to T1 and T2 (T2>T1).

According to the fourth embodiment as described above, the time allowance is set so as to correspond to a quick movement of a viewpoint. Thus, a user does not have to fix his viewpoint intentionally, thereby enabling the apparatus to provide information processing of high quality and of convenient operability.

<Fifth Embodiment>

Figure 17A:
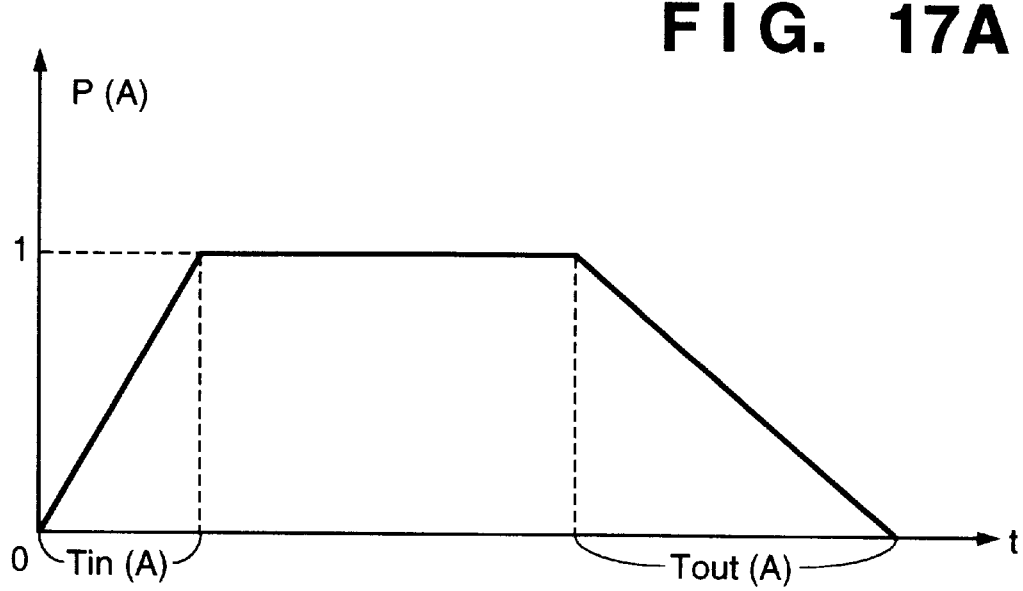
FIGS. 17A and 17B are graphs showing changes of weights with respect to time according to a fifth embodiment.
Figure 17B:
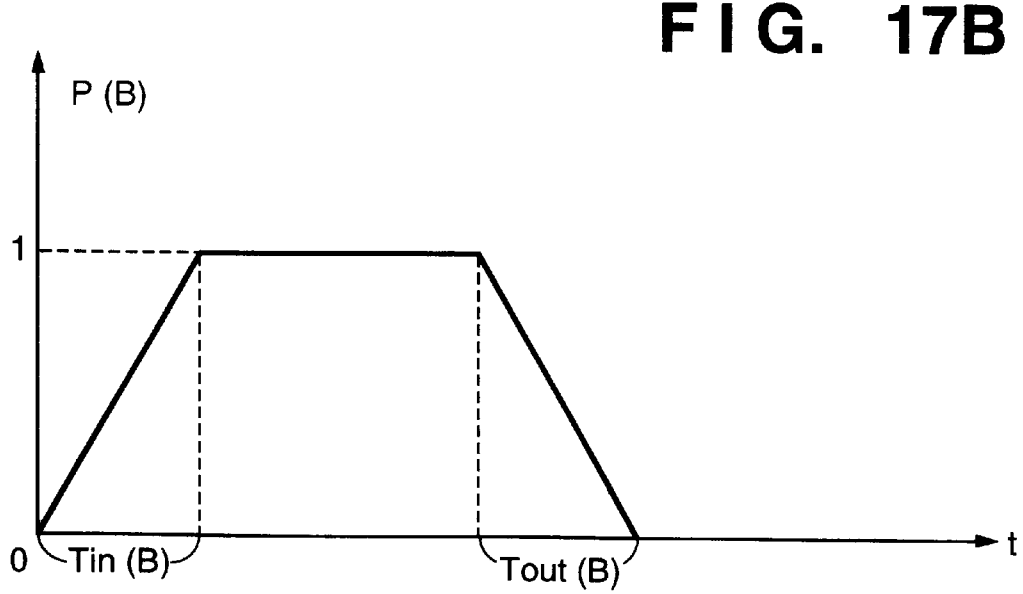

A fifth embodiment will now be explained. In the fifth embodiment, the sensitivity to decide the weight for classes of recognition information controlled in accordance with a viewpoint is different for each class of recognition information. A time period since a viewpoint entered an icon of an application A until the weight becomes 1 is denoted by Tin(A), and a time period since the viewpoint exited the icon of the application A until the weight becomes 0 is denoted by Tout (A). Similarly, Tin (B) and Tout (B) are denoted. FIGS. 17A and 17B are graphs showing the changes of weight with respect to time, where Tin (A)=1 sec., Tout (A)=2 sec., Tin (B)=1 sec., and Tout (B)=1 sec. In this case, P(A) has higher sensitivity than P(B), and thus the class of the recognition information for the application (A) is more likely selected.

According to the fifth embodiment, the time allowance is set so as to correspond to quick movement of a viewpoint, as in the fourth embodiment.

<Sixth Embodiment>

Figure 18:
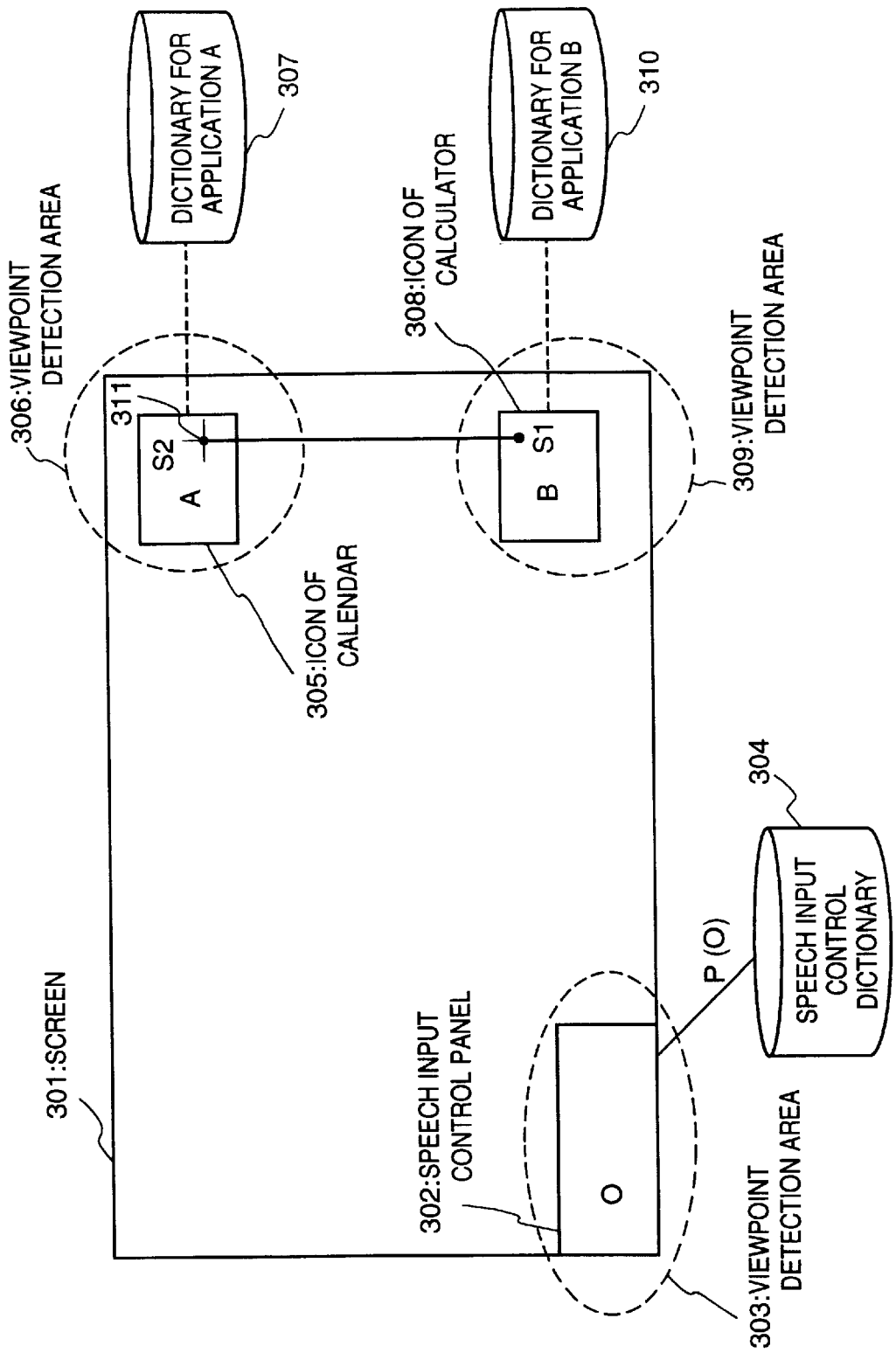
FIG. 18 shows a picture on a display screen in an example of an operation according to a sixth embodiment.

A sixth embodiment will be explained below. The sixth embodiment is an example in which weight for each class of recognition information is controlled depending upon a changed viewpoint when the viewpoint is moved during recognizing speech. FIG. 18 shows a picture on a display screen in an example of an operation according to the sixth embodiment.

Assume that a user is watching an icon B, and his viewpoint is at a position S1. Under this condition, the weight for each class of recognition information is,
P (O)=0
P(A)=0
P(B)=1.
Now, if the user pronounces "May 1990" (may nineteen-ninety), and the viewpoint just before he finished pronouncing is at a position S2, then the weight for each class of recognition information changes to,
P (O)=0
P(A)=1
P(B)=0.

In the sixth embodiment, after speech is inputted, a viewpoint is detected in advance of speech recognition process, and the weight is determined depending upon the detected viewpoint.

The processing sequence is the same as the flowchart in FIG. 14 with steps S50 and S51 moved between step S52 and step S53. At step S50, a current viewpoint is detected and, at step S51, the weight corresponding to each application can be obtained on the basis of the detected viewpoint.

According to the sixth embodiment, the user has a time allowance to move his viewpoint to a desired icon before finishing the inputting speech.

<Seventh Embodiment>

Figure 19:
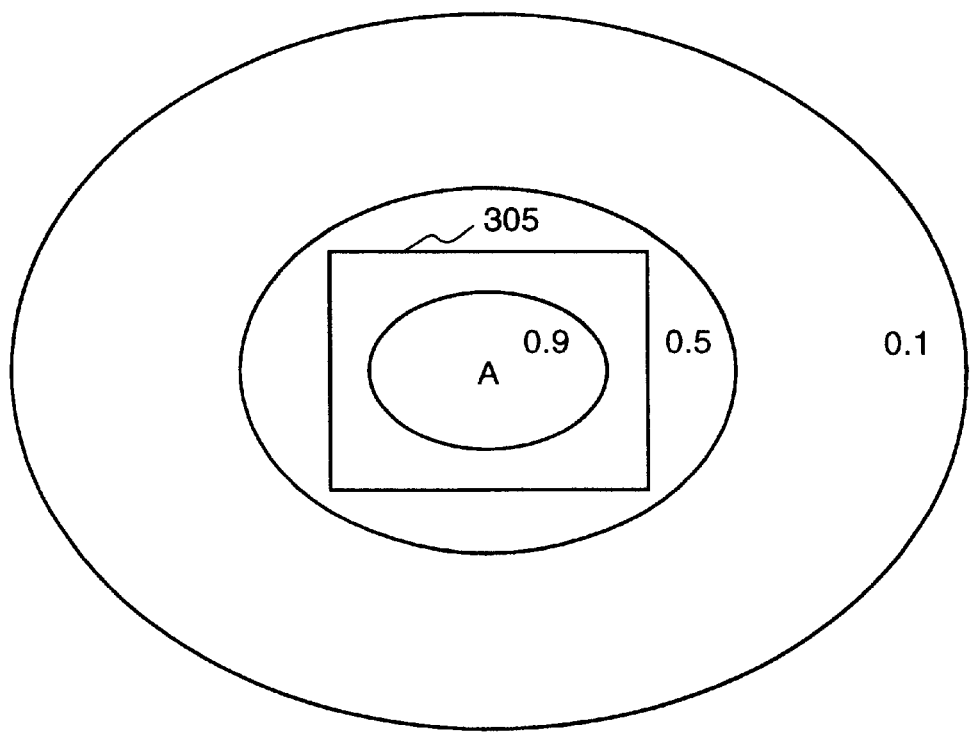
FIG. 19 is a graphical representation showing the correspondence between viewpoint detection areas and weights according to a seventh embodiment.

In the first and second embodiments explained with reference to FIGS. 7 to 9 and FIG. 13, a viewpoint is detected in a fixed time and space of each viewpoint detection area. However, the viewpoint can be determined more flexibly, such as by probability. FIG. 19 is a graphical representation showing the correspondence between viewpoint detection areas and the weight according to a seventh embodiment. In FIG. 19, three ranges of the viewpoint detection areas corresponding to three different weights, P(A)=0.9, 0.5, and 0.1, are set. More specifically, the weight is set higher as the viewpoint is closer to the icon 305. Therefore, the icon which is closest to the user's viewpoint is considered as the one desired by the user. Accordingly, the probability that the icon which is considered that the user is more interested in becomes higher. Thus, there is an area allowance in detecting a viewpoint, thereby increasing operability.

Note that, in the seventh embodiment, an average of weight corresponding to areas in which the viewpoint has stayed during a predetermined time period is used as a final weight. The obtained weight is multiplied by the speech recognition probability.

Further, in the aforesaid embodiments, the viewpoint is detected in image processes using a camera. But the present invention is not limited to this, and a detecting device, such as line of sight detection glasses, can be used instead of a camera.

Furthermore, in the aforesaid embodiment, recognition processing is performed on the basis of words and their recognition probabilities for the sake of simplicity. However, the recognition processing can be performed based on sentences, grammar, and recognition probabilities thereof, for example.

Figure 20:
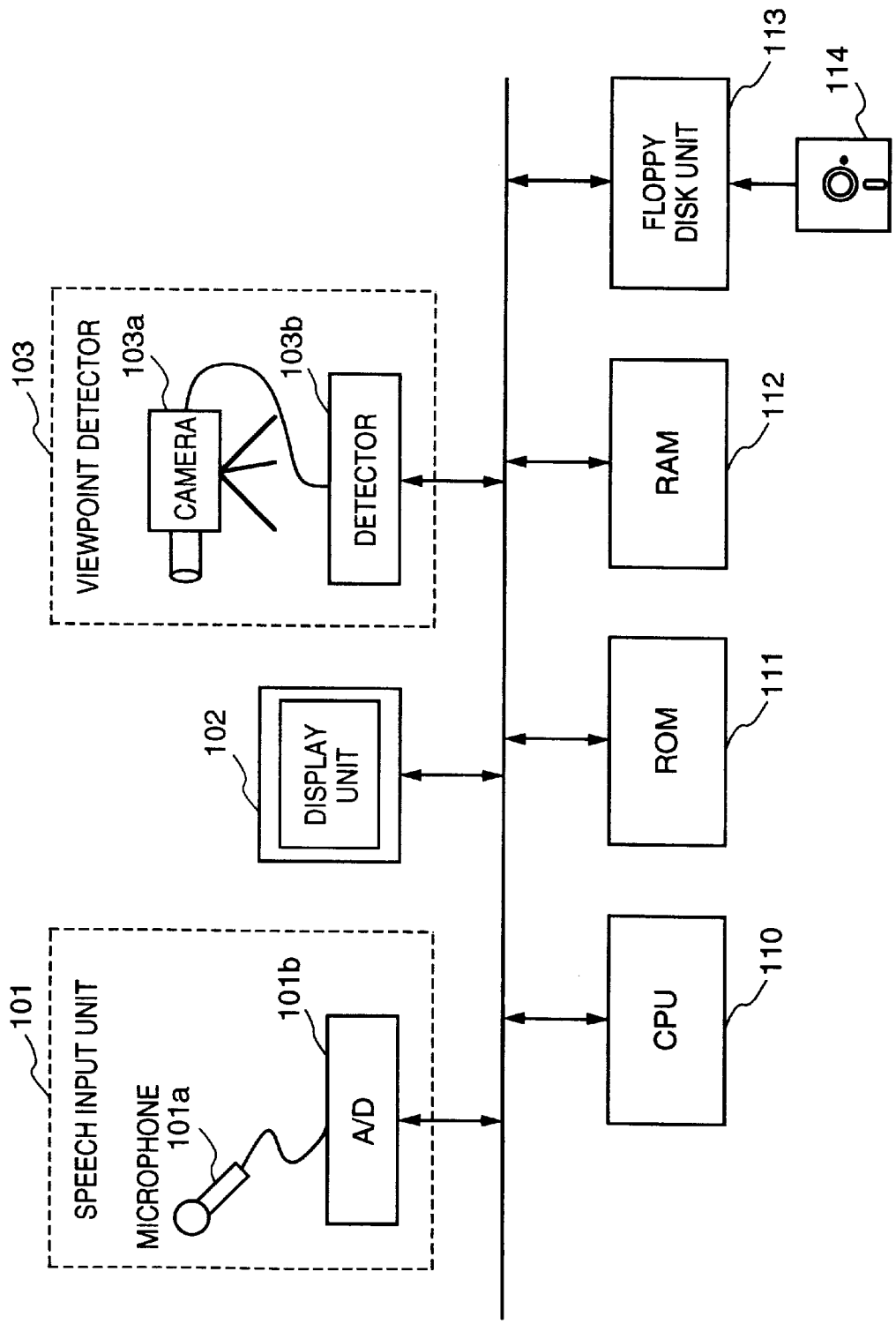
FIG. 20 is a block diagram showing a configuration of an information processing apparatus according to the embodiments when a control program provided by a storage medium is loaded and executed.

An object of the present invention which can be achieved by the aforesaid apparatus or the method according to the above description can also be achieved by a system storing a program according to the invention. More specifically, by attaching a storage medium to the aforesaid apparatus, the program loaded from the storage medium can constitute the new function of the invention. An example of a configuration of an apparatus with the storage medium is shown in FIG. 20. CPU 110 realizes various kinds of functions by executing a control program stored in ROM 111 or RAM 112. In this example, a floppy disk 114 is inserted into a floppy disk unit 113, and a control program capable of realizing functions (functions explained with reference to the aforesaid flowchart of the speech recognition unit 104, the recognition information controller 105, and the viewpoint manager 106 shown in FIG. 1) is loaded to the RAM 112. then the CPU 110 executes the program. Note that the control program is not only provided by the floppy disk, but also by any kind of storage medium, such as an ID card, a hard disk, and CD-ROM, or can be loaded through a network.

Figure 21:
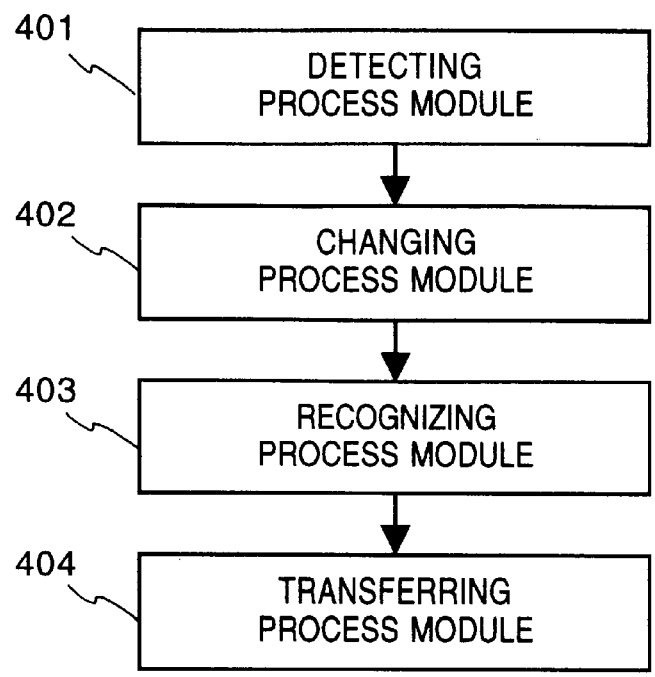
FIG. 21 is a flowchart showing a sequence to execute each processing module provided by a storage medium.
Figure 22:
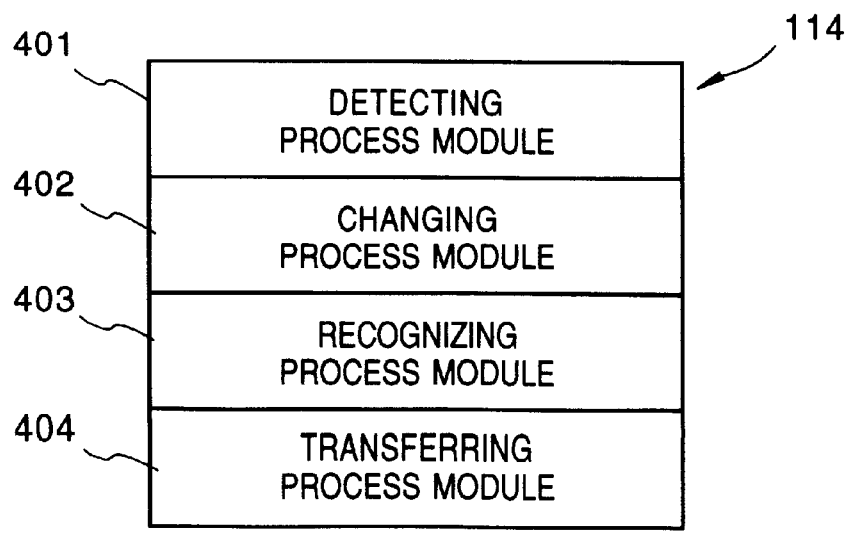
FIG. 22 is a memory map showing a storage situation of processing modules.

A structural feature of the program of the present invention is as shown in FIGS. 21 and 22.

FIG. 21 is a flowchart showing an operational sequence to execute each program module provided by a storage medium. Further, FIG. 22 is a memory map showing a storage situation of program modules.

A detecting process module 401 is for controlling the viewpoint detector 103 to detect the viewpoint of a user. A changing process module 402 is for changing kinds of recognition processes in accordance with the detected viewpoint. Here, to change the kinds of recognition processes, the classes of recognition information (dictionary for recognition) to be used are changed in accordance with where the viewpoint stays, for instance. Alternatively, the weight to be applied to each class of recognition information is changed in accordance with the viewpoint in the recognition process. A recognizing process module 403 is for recognizing speech inputted from the speech input unit 101 by following the changed recognition processes. Further, a transferring process module 404 is for transferring the recognized result to an application corresponding to the class of recognition information used by the recognizing process module.

The processes by each of the aforesaid modules corresponds to the control operations represented by flowcharts in FIGS. 11, 12, and 14.

Further, the present invention can be applied to a system constituted by a plurality of devices or to an apparatus comprising a single device.

Furthermore, the invention is applicable also to a case where the invention is embodied by supplying a program to a system or apparatus. In this case, a storage medium, storing a program according to the invention, constitutes the invention. The system or apparatus installed with the program read from the storage medium realizes the functions according to the invention.

As described above, according to the present invention, the user's attention and interest can be determined properly from his viewpoint, so that it is possible to control recognition information to be used in speech recognition in accordance with the detected viewpoint. Accordingly, the capabilities of the apparatus, such as the speech recognition probability and the speed of recognition, are improved.

As many apparently widely different embodiments of the present invention can be made without departing from the spirit and scope thereof, it is to be understood that the invention is not limited to the specific embodiments thereof except as defined in the claims.

What is claimed is:

1. A speech recognition apparatus comprising:
   detecting means for detecting a viewpoint of a user;
   selecting means for selecting both an application from a plurality of applications and a recognition process from a plurality of recognition processes in accordance with the viewpoint detected by said detecting means at the time speech is pronounced; and
   recognizing means for recognizing an input command in pronounced speech to be subjected to the application selected by said selecting means, by executing the speech recognition corresponding to the recognition process selected by said selecting means, for the pronounced speech.

2. The speech recognition apparatus according to claim 1, wherein said changing means changes classes of recognition information to be used for the speech recognition in accordance with the viewpoint detected by said detecting means.

3. The speech recognition apparatus according to claim 2, wherein said changing means sets a plurality of areas each of which is related to a different class of the recognition information, selects one of the plurality of areas in accordance with the viewpoint detected by said detecting means, and determines a class of the recognition information, related to the selected area, to be used in the speech recognition.

4. The speech recognition apparatus according to claim 3, wherein one of the plurality of areas is set for each respective image, shown on a display screen, representing an application and has a predetermined size in which the image is included.

5. The speech recognition apparatus according to claim 3, wherein said changing means detects a position where the viewpoint stays on the basis of the viewpoint detected by said detecting means and selects one of the plurality of areas which includes said position.

6. The speech recognition apparatus according to claim 1, wherein said changing means controls weight for each class of the recognition information to be used in the speech recognition in accordance with the viewpoint detected by said detecting means.

7. The speech recognition apparatus according to claim 6, wherein said changing means sets a plurality of areas each of which is related to a different class of recognition information and controls the weight for each class of the recognition information in accordance with relationship between the viewpoint detected by said detecting means and each of the plurality of areas.

8. The speech recognition apparatus according to claim 7, wherein one of the plurality of areas is set for each respective image, shown on a display screen, representing an application and has a predetermined size in which the image is included.

9. The speech recognition apparatus according to claim 7, wherein said changing means counts a number of times a viewpoint has stayed in the plurality of areas during a predetermined time period on the basis of the viewpoint detected by said detecting means, and controls weight for each class of the recognition information to be used in the speech recognition in accordance with the counted number.

10. The speech recognition apparatus according to claim 7, wherein said changing means detects a position where the viewpoint stays on the basis of the viewpoint detected by said detecting means, and controls the weight for each class of the recognition information in accordance with relationship between the position and each of the plurality of areas.

11. The speech recognition apparatus according to claim 7, wherein said changing means assigns a maximum value to weight for a class of the recognition information related to one of the plurality of areas in which the viewpoint stays, and assigns a minimum value to weight for other classes of the recognition information.

12. The speech recognition apparatus according to claim 11, wherein, in a case where the viewpoint exits from the area where it has stayed, said changing means changes the weight for the class of the recognition information related to the area in which the viewpoint had stayed to the minimum value after a predetermined time period has elapsed.

13. The speech recognition apparatus according to claim 11, wherein, in a case where the viewpoint exits from the area where it has stayed, said changing means gradually decrease the weight for the class of the recognition information related to the area in which the viewpoint had stayed toward the minimum value as time elapses.

14. The speech recognition apparatus according to claim 13, wherein rate of weight changes differ from each other depending upon different classes of the recognition information.

15. The speech recognition apparatus according to claim 11, wherein, in a case where the viewpoint enters one of the plurality of areas, said changing means gradually increases the weight for a class of the recognition information related to the area which the viewpoint entered toward the maximum value as time elapses.

16. The speech recognition apparatus according to claim 15, wherein rate of weight changes differ from each other depending upon classes of the recognition information each of which is related to one of the plurality of areas.

17. The speech recognition apparatus according to claim 7, wherein each of the plurality of areas is divided into a plurality of fields, and said changing means controls weight for each class of the recognition information in accordance with the field in which the viewpoint detected by said detecting means is.

18. The speech recognition apparatus according to claim 1, wherein said changing means changes recognition processes on the basis of a viewpoint detected by said detecting means just before the speech recognition is performed by said recognizing means.

19. The speech recognition apparatus according to claim 1, wherein said selecting means selects an application for performing an input command based on the viewpoint detected by said detecting means and selects recognition processes for speech recognition in accordance with the selected application.

20. The speech recognition apparatus according to claim 1, wherein said selecting means sets a plurality of areas each of which is related to a different application, selects one of the plurality of areas in accordance with the viewpoint detected by said detecting means, and selects an application related to the selected area.

21. A speech recognition method comprising:
a detecting step of detecting a viewpoint of a user;
a selecting step of selecting both an application from a plurality of applications and a recognition process from a plurality of recognition processes in accordance with the viewpoint detected in said detecting step; and
a recognizing step for recognizing an input command to be subjected to the application selected by said selecting step, by executing the speech recognition corresponding to the recognition process selected in said selecting step.

22. The speech recognition method according to claim 21, wherein, in said selecting step, classes of recognition information to be used for the speech recognition are selected in accordance with the viewpoint detected in said detecting step.

23. The speech recognition method according to claim 22, wherein, in said selecting step, a plurality of areas each of which is related to a different application and a different class of the recognition information are set, and one of the plurality of areas is selected in accordance with the viewpoint detected in said detecting step, and a class of the recognition information related to the selected area is selected.

24. The speech recognition method according to claim 21, wherein one of the plurality of areas is set for each respective image, shown on a display screen, representing an application and has a predetermined size in which the image is included.

25. The speech recognition method according to claim 23, wherein, in said selecting step, a position where the viewpoint stays is detected on the basis of the viewpoint detected in said detecting step and one of the plurality of areas which includes said position is selected.

26. The speech recognition method according to claim 21, further comprising the step of controlling the weight for each class of recognition information to be used in the recognition process is controlled in accordance with the viewpoint detected in said detecting step and executing the speech recognition using classes of the recognition,
wherein said selecting step selects a class of the recognition information based on the weight and recognition results of said executing step and selects an application corresponding to the selected recognition information, and wherein said recognizing step determines the recognition result of the speech recognition corresponding to the selected class of the recognition information as an input command to be subjected to the selected application.

27. The speech recognition method according to claim 26, wherein, in said selecting step, a plurality of areas each of which is related to a different class of recognition information are set and the weight for each class of the recognition information is controlled in accordance with relationship between the viewpoint detected in said detecting step and each of the plurality of areas.

28. The speech recognition method according to claim 25, wherein one of the plurality of areas is set for each respective image, shown on a display screen, representing an application and has a predetermined size in which the image is included.

29. The speech recognition method according to claim 27, wherein, in said selecting step, a number of times a viewpoint has stayed in the plurality of areas is counted during a predetermined time period on the basis of the viewpoint detected in said detecting step, and the weight for each class of the recognition information to be used in the speech recognition is controlled in accordance with the counted number.

30. The speech recognition method according to claim 27, wherein, in said selecting step, a position where the viewpoint stays is detected on the basis of the viewpoint detected in said detecting step, and the weight for each class of the recognition information is controlled in accordance with relationship between the position and each of the plurality of areas.

31. The speech recognition method according to claim 27, wherein, in said selecting step, a maximum value is assigned to the weight for a class of the recognition information related to one of the plurality of areas in which the viewpoint stays, and a minimum value is assigned to the weight for other classes of the recognition information.

32. The speech recognition method according to claim 31, wherein, in a case where the viewpoint exits from the area where it has stayed, the weight for the class of the recognition information related to the area in which the viewpoint had stayed is changed to the minimum value, after a predetermined time period has elapsed, in said selecting step.

33. The speech recognition method according to claim 31, wherein, in a case where the viewpoint exits from the area where it has stayed, the weight for the class of the recognition information related to the area in which the viewpoint had stayed is gradually decreased, toward the minimum value as time elapses, in said selecting step.

34. The speech recognition method according to claim 31, wherein rate of weight changes differ from each other depending upon different classes of the recognition information.

35. The speech recognition method according to claim 31, wherein, in a case where the viewpoint enters one of the plurality of areas, the weight for a class of the recognition information related to the area which the viewpoint entered is gradually increased, toward the maximum value as time elapses, in said selecting step.

36. The speech recognition method according to claim 33, wherein rate of weight changes differ from each other depending upon classes of the recognition information each of which is related to one of the plurality of areas.

37. The speech recognition method according to claim 27, wherein each of the plurality of areas is divided into a plurality of fields, and, in said selecting step, the weight for each class of the recognition information is controlled in accordance with the field to which the viewpoint detected in said detecting step is directed.

38. The speech recognition method according to claim 21, wherein, in said selecting step, recognition processes on the basis of a viewpoint detected in said detecting step are selected just before the speech recognition is performed in said recognizing step.

39. The speech recognition method according to claim 21, wherein said selecting step selects an application for performing an input command based on the viewpoint detected by said detecting step an selects recognition processes for speech recognition in accordance with the selected application.

40. The speech recognition method according to claim 21, wherein said selecting step sets a plurality of areas each of which is related to a different application, selects one of the plurality of areas in accordance with the viewpoint detected by said detecting step, and selects an application related to the selected area.

41. An information processing apparatus comprising:
   detecting means for detecting a viewpoint of a user;
   selecting means for selecting both an application from a plurality of applications and a recognition process from a plurality of recognition processes in accordance with the viewpoint detected by said detecting means at the time speech is pronounced;
   recognizing means for recognizing an input command, in the pronounced speech, to be subjected to the application selected by said selecting means, by executing the speech recognition corresponding to the recognition process selected by said selecting means, for the pronounced speech; and
   executing means for executing the application to perform the input command recognized by said recognizing means.

42. The speech recognition apparatus according to claim 41, wherein said selecting means selects a class of recognition information to be used for the speech recognition in accordance with the viewpoint detected by said detecting means, and selects an application in accordance with the selected class of the recognition information.

43. The speech recognition apparatus according to claim 41, further comprising control means for controlling the weight for each class of the recognition information to be used in the speech recognition in accordance with the viewpoint detected by said detecting means, and execution means for executing the speech recognition using classes of the recognition,
   wherein said selecting means selects a class of the recognition information based on the weight and recognition results of said execution means, and selects an application corresponding to the selected recognition information, and said recognizing means determines the recognition result of the speech recognition corresponding to the selected class of the recognition information as an input command to be subjected to the selected application.

44. The information processing apparatus according to claim 37, further comprising display means for displaying images representing each of a plurality of applications,
   wherein said changing means sets a plurality of areas each of which includes each of the plurality of images and changes recognition processes in accordance with the relationship between the viewpoint detected by said detecting means and each of the plurality of areas.

45. A computer program product comprising a computer usable medium having computer readable program code means embodied in said medium for speech recognition processing, said product including:
   first computer readable program code means for causing a computer to detect a viewpoint of a user;
   second computer readable program code means for causing a computer to select both an application from a plurality of applications and a recognition process from a plurality of recognition processes in accordance with the viewpoint, at the time speech is pronounced, caused to be detected by said first computer readable program code means; and
   third computer readable program code means for causing a computer to recognize an input command, in the pronounced speech, to be subjected to the application caused to be selected by said second computer readable program code means, by causing the computer to execute the speech recognition corresponding to the recognition process, for the pronounced speech, caused to be selected by said second computer readable program code means.

46. A computer program product according to claim 45, wherein said second computer readable program code means causes the computer to select a class of recognition information to be used for the speech recognition in accordance with the viewpoint caused to be detected by said first computer readable program code means.

47. A computer program product according to claim 45, further comprising fourth computer readable program code means for causing the computer to control the weight of each class of the recognition information to be used in the speech recognition in accordance with the viewpoint caused to be detected by said first computer readable program code means and causing the computer to execute the speech recognition using classes of the recognition, wherein said second computer readable program code means causes the computer to select a class of the recognition information based on the controlled weights and recognition results caused to be obtained by said fourth computer readable program code means, and selects an application corresponding to the selected recognition information, and said second computer readable program code means causes the computer to determine the recognition result of the speech recognition corresponding to the selected class of the recognition information as an input command to be subjected to the selected application.

48. A computer program product according to claim 46 further comprising fourth computer readable program code means for causing the computer to select one of the plurality of applications in accordance with a class of the recognition information to be used in the recognizing operation and to transmit a recognized result in said recognition process to the selected application.

* * * * *

UNITED STATES PATENT AND TRADEMARK OFFICE
CERTIFICATE OF CORRECTION

PATENT NO. : 6,076,061
DATED : June 13, 2000
INVENTOR(S) : Katsuhiko Kawasaki, et al.

It is certified that error appears in the above-identified patent and that said Letters Patent is hereby corrected as shown below:

Title page,
[56], References Cited, OTHER PUBLICATIONS:
"Ronald stephens" should read -- Ronald Stephens --.
"Scientis," should read -- Scientist --.

Drawings:
Sheet 10, Figure 10, "RALATED" should be -- RELATED --.

Column 1:
Line 7, "Substitute Specification for U.S. Patent Application Set" should be deleted.
Line 8, "No. 08/524,949, filed Sept. 8, 1995" should be deleted.

Column 2:
Line 13, after "application." insert the following as a new paragraph:
-- According to still another aspect, the present invention which achieves these objectives relates to a computer program product comprising a computer usable medium having computer readable program code means embodied in the medium for speech recognition processing. The product includes first computer readable program code means for causing a computer to detect a viewpoint of a user, and second computer readable program code means for causing the computer to select an application for performing an input command and recognition processes for speech recognition in accordance with the viewpoint caused to be detected by said first computer readable program code means. The product further comprises third computer readable program code means for causing the computer to recognize an input command to be subjected to the application caused to be selected by said second computer readable program code means, by executing the speech recognition corresponding to the recognition process caused to be selected by said second computer readable program code means. --.

Column 3:
Line 50, "FIG. 26." should read -- FIG. 20. --.

Column 7:
Line 47, delete "and"
Line 51, ""82+3="" should read -- "2+3=" --.

UNITED STATES PATENT AND TRADEMARK OFFICE
CERTIFICATE OF CORRECTION

PATENT NO. : 6,076,061
DATED : June 13, 2000
INVENTOR(S) : Katsuhiko Kawasaki, et al.

It is certified that error appears in the above-identified patent and that said Letters Patent is hereby corrected as shown below:

Column 10:
Line 5, "S55)" should read -- S55). -- and "According" should read -- ¶According --.
Line 67, "P() x PS()" should be deleted.

Column 11:
Line 10, "by detecting the distances" should read -- the distances are detected --.
Line 19, "forth" should read -- fourth --.

Column 12:
Line 55, "is" should read -- it is --.
Line 59, "of" should read -- of the --.

Column 14:
Line 24, "changing means changes" should read -- selecting means selects --.
Line 28, "changing" should read -- selecting --.
Line 29, "class" should read -- application and a different class --.
Line 32, "determines" should read -- selects an application and -- and "information," should read -- information --.
Line 33, "area, to be used in the speech" should read -- area --.
Line 34, "recognition." should be deleted.
Line 41, "changing should read -- selection --.
Line 46, "wherein said changing means controls" should read -- further comprising control means for controlling --.
Line 49, "means." should read -- means, and execution means for executing the speech recognition using classes of the recognition,
    wherein said selecting means selects a class of the recognition information based on the weight and recognition results of said execution means, and selects an application corresponding to the selected recognition information, and said recognizing means determines the recognition result of the speech recognition corresponding to the selected class of the recognition information as an input command to be subjected to the selected application. --.
Line 51, "changing" should read -- selecting --.
Line 54, "with" should read -- with the --.
Line 63, "changing" should read -- selecting --.
Line 66, "weight" should read -- the weight --.

UNITED STATES PATENT AND TRADEMARK OFFICE
CERTIFICATE OF CORRECTION

PATENT NO. : 6,076,061
DATED : June 13, 2000
INVENTOR(S) : Katsuhiko Kawasaki, et al.

It is certified that error appears in the above-identified patent and that said Letters Patent is hereby corrected as shown below:

Column 15:
Line 2, "changing" should read -- selecting --.
Line 5, "with" should read -- with the --.
Line 8, "changing" should read -- selecting --.
Line 9, "to" should read -- to the --.
Line 11, "to" should read -- to the --.
Line 15, "changing" should read -- selecting --.
Line 21, "changing" should read -- selecting --.
Line 22, "decrease" should read -- decreases --.
Line 26, "wherein" should read -- wherein the --.
Line 31, "changing" should read -- selecting --.
Line 36, "wherein" should read -- wherein the --.
Line 41, "changing" should read -- selecting --; and "weight" should read
-- the weight --.
Line 43, "in" should read -- to --.
Line 44, "is." should read -- is directed. --.
Line 46, "changing means changes" should read -- selecting means selects --.

Column 16:
Line 19, "claim 21," should read -- claim 23, --.
Line 32, "is" should read --, the weight being --.
Line 48, "with" should read -- with the --.
Line 51, "claim 25," should read -- claim 27, --.

Column 17:
Line 1, "with" should read -- with the --.
Line 22, "claim 31," should read -- claim 33 --.
Line 23, "rate" should read -- the rates --.
Line 32, "claim 33," should read -- claim 35, --.
Line 33, "rate" should read -- the rates --.
Line 50, "an" should read -- and --.

UNITED STATES PATENT AND TRADEMARK OFFICE
CERTIFICATE OF CORRECTION

PATENT NO. : 6,076,061
DATED : June 13, 2000
INVENTOR(S) : Katsuhiko Kawasaki, et al.

It is certified that error appears in the above-identified patent and that said Letters Patent is hereby corrected as shown below:

Column 18:
Line 31, "claim 37," should read -- claim 41, --.
Line 33, "changing" should read -- selecting --.
Line 35, "changes" should read -- selects --.

Signed and Sealed this

Twenty-seventh Day of November, 2001

Attest:

*Nicholas P. Godici*

NICHOLAS P. GODICI
*Attesting Officer*  *Acting Director of the United States Patent and Trademark Office*